United States Patent
Wu et al.

(10) Patent No.: US 9,767,021 B1
(45) Date of Patent: Sep. 19, 2017

(54) OPTIMIZING DESTAGING OF DATA TO PHYSICAL STORAGE DEVICES

(71) Applicant: EMC IP Holding Company LLC, Hopkinton, MA (US)

(72) Inventors: Peng Wu, Westborough, MA (US); Rong Yu, Franklin, MA (US); Dan Aharoni, Brookline, MA (US); Alexandr Veprinsky, Brookline, MA (US); Amnon Naamad, Brookline, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 14/490,756

(22) Filed: Sep. 19, 2014

(51) Int. Cl.
*G06F 12/0804* (2016.01)
*G06F 12/0846* (2016.01)
*G06F 12/126* (2016.01)

(52) U.S. Cl.
CPC ...... *G06F 12/0804* (2013.01); *G06F 12/0848* (2013.01); *G06F 12/126* (2013.01); *G06F 2212/282* (2013.01)

(58) Field of Classification Search
None
See application file for complete search history.

(56) References Cited

U.S. PATENT DOCUMENTS

| 7,047,366 | B1 | 5/2006 | Ezra |
| 7,143,393 | B1 | 11/2006 | Ezra et al. |
| 7,177,853 | B1 | 2/2007 | Ezra et al. |
| 7,558,919 | B1 | 7/2009 | Yochai et al. |
| 7,577,787 | B1 * | 8/2009 | Yochai ............... G06F 12/0804 711/113 |
| 8,046,551 | B1 | 10/2011 | Sahin |
| 9,235,516 | B1 | 1/2016 | Marshak et al. |
| 2003/0212865 | A1 * | 11/2003 | Hicken ............... G06F 12/0804 711/135 |
| 2008/0126708 | A1 * | 5/2008 | Gill ................... G06F 12/0804 711/118 |
| 2011/0016276 | A1 * | 1/2011 | Wang ................. G06F 12/123 711/133 |
| 2013/0326149 | A1 * | 12/2013 | Barrell ............... G06F 12/0891 711/135 |
| 2013/0346557 | A1 * | 12/2013 | Chang ................ G06F 9/45558 709/217 |
| 2014/0068195 | A1 * | 3/2014 | Mannenbach ........ G06F 12/126 711/133 |
| 2014/0379990 | A1 * | 12/2014 | Pan ................... G06F 12/0804 711/135 |

* cited by examiner

*Primary Examiner* — Gurtej Bansal
*Assistant Examiner* — Charles Choi
(74) *Attorney, Agent, or Firm* — Muirhead and Saturnelli, LLC

(57) ABSTRACT

Described are techniques for destaging data. Write data for write operations are stored in cache page(s). The cache may be partitioned into cache pages and write data stored thereon may be marked as write pending denoting that write data needs to be written out to physical storage. Weight values may be determined for the cache pages in accordance with factors. A first cache page may be selected having a highest such weight value where the selected first cache page includes at least some write data marked as write pending. The write data of the selected first cache page may be destaged to physical storage.

19 Claims, 15 Drawing Sheets

OPTIMIZING DESTAGING OF DATA TO PHYSICAL STORAGE DEVICES

BACKGROUND

Technical Field

This application generally relates to data storage and, more particularly, techniques for destaging data to physical storage devices.

Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more host processors and provide storage services to each host processor. Multiple data storage systems from one or more different vendors may be connected and may provide common data storage for one or more host processors in a computer system.

A host may perform a variety of data processing tasks and operations using the data storage system. For example, a host may perform basic system I/O (input/output) operations in connection with data requests, such as data read and write operations.

Host systems may store and retrieve data using a data storage system containing a plurality of host interface units, disk drives (or more generally storage devices), and disk interface units. Such data storage systems are provided, for example, by EMC Corporation of Hopkinton, Mass. The host systems access the storage devices through a plurality of channels provided therewith. Host systems provide data and access control information through the channels to a storage device of the data storage system and data of the storage device is also provided from the data storage system to the host systems also through the channels. The host systems do not address the disk drives of the data storage system directly, but rather, access what appears to the host systems as a plurality of logical units, logical devices or logical volumes. The logical units may or may not correspond to the actual physical drives. Allowing multiple host systems to access the single data storage system allows the host systems to share data stored therein.

SUMMARY OF THE INVENTION

In accordance with one aspect of the invention is a method of destaging data comprising: receiving a plurality of I/O operations, said plurality of I/O operations including one or more write operations; storing write data from the one or more write operations in one or more cache pages of a cache, wherein the cache is partitioned into a plurality of cache pages and the write data stored in the one or more cache pages is marked as write pending thereby denoting that the one or more cache pages include write data to be written out to physical storage; determining a plurality of weight values for the plurality of cache pages, wherein each of the plurality of weight values is determined for a different one of the plurality of cache pages in accordance with a plurality of factors; selecting a first cache page of the plurality of cache pages having a highest weight value of the plurality of weight values, wherein the first cache page includes at least some of the write data; and destaging the at least some of the write data of the first cache page to physical storage. The plurality of factors may include a first factor identifying an amount of time since write pending data was last written to a cache page. Each single one of the plurality of cache pages may be partitioned into a plurality of portions and the plurality of factors may include a second factor identifying any of a first ratio of a number of missing data portions of a cache page with respect to the plurality of portions in a single cache page and a second ratio of a number of data portions present in a cache page with respect to the plurality of portions in a single cache page. The plurality of factors may include a third factor identifying a gap sequential factor denoting a number of missing data gaps in a cache page. The first factor may be associated with a first weighting coefficient, the second factor may be associated with a second weighting coefficient, and the third factor may be associated with a third weighting coefficient. Each of the first weighting coefficient, the second weighting coefficient, and the third weighting coefficient may have a value denoting a relative level importance of each of the first weighting coefficient, the second weighting coefficient, and the third weighting coefficient. The third weighting coefficient may be greater than the first weighting coefficient and the second weighting coefficient. If the said second factor identifies the first ratio of a number of missing data portions of a cache page with respect to the plurality of portions in a single cache page, the second weighting coefficient may be a negative value, and if the second factor identifies a second ratio of a number of data portions present in a cache page with respect to the plurality of portions in a single cache page, said second weighting coefficient may be a positive value. The method may further include sorting the plurality of cache pages in accordance with the plurality of weight values. The sorting may produce a ranked list of the plurality of cache pages whereby each of the plurality of cache pages at a position in the list having an associated one of the plurality of weight values is ranked higher than any other of the plurality of cache pages having another associated one of the weight values that is lower than said associated weight value. The plurality of factors may assess characteristics of a cache page related to destaging performance. First processing may be performed responsive to determining that at least a first threshold amount of the cache is consumed for storing write pending data, and the first processing may include selecting the first cache page and destaging at least some of the write data of the first cache page to physical storage. The first processing may destage write pending data from the cache in accordance with a level of aggressiveness affecting an amount of write pending data destaged from the cache to physical storage. The level of aggressiveness may be determined in accordance with an amount of the cache currently consumed for storing write pending data relative to a second threshold. The method may include receiving a write operation that writes first data to a first logical device; determining a first amount of the cache currently consumed for storing write pending data directed to the first logical device; determining, in accordance with the first amount relative to a threshold amount of cache per logical device, a level of aggressiveness related to destaging write pending data from the cache for the first logical device; and destaging, in accordance with the level of aggressiveness, an amount of write pending data that is stored in the cache and directed the first logical device.

In accordance with another aspect of the invention is a system comprising: a processor; and a memory comprising code stored thereon that, when executed by the processor, performs a method that destages data comprising: receiving a plurality of I/O operations, said plurality of I/O operations including one or more write operations; storing write data from the one or more write operations in one or more cache pages of a cache, wherein the cache is partitioned into a plurality of cache pages and the write data stored in the one or more cache pages is marked as write pending thereby denoting that the one or more cache pages include write data to be written out to physical storage; determining a plurality of weight values for the plurality of cache pages, wherein each of the plurality of weight values is determined for a different one of the plurality of cache pages in accordance with a plurality of factors; selecting a first cache page of the plurality of cache pages having a highest weight value of the plurality of weight values, wherein the first cache page includes at least some of the write data; and destaging the at least some of the write data of the first cache page to physical storage. The plurality of factors may assess characteristics of a cache page related to destaging performance and the first cache page with the highest weight value may be assessed as having write pending data stored therein that, when destaged, achieves a best destaging performance relative to any other cache pages of the cache.

In accordance with another aspect of the invention is a non-transitory computer readable medium comprising code stored thereon that, when executed, performs a method that destages data, the method comprising: receiving a plurality of I/O operations, said plurality of I/O operations including one or more write operations; storing write data from the one or more write operations in one or more cache pages of a cache, wherein the cache is partitioned into a plurality of cache pages and the write data stored in the one or more cache pages is marked as write pending thereby denoting that the one or more cache pages include write data to be written out to physical storage; determining a plurality of weight values for the plurality of cache pages, wherein each of the plurality of weight values is determined for a different one of the plurality of cache pages in accordance with a plurality of factors; selecting a first cache page of the plurality of cache pages having the highest weight value of the plurality of weight values, wherein the first cache page includes at least some of the write data; and destaging the at least some of the write data of the first cache page to physical storage. The plurality of factors may assess characteristics of a cache page related to destaging performance. The plurality of factors may include a first factor identifying an amount of time since write pending data was last written to a cache page, a second factor related to a number of missing data portions of a cache page, and a third factor identifying a gap sequential factor denoting a number of missing data gaps in a cache page.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Figure 1:
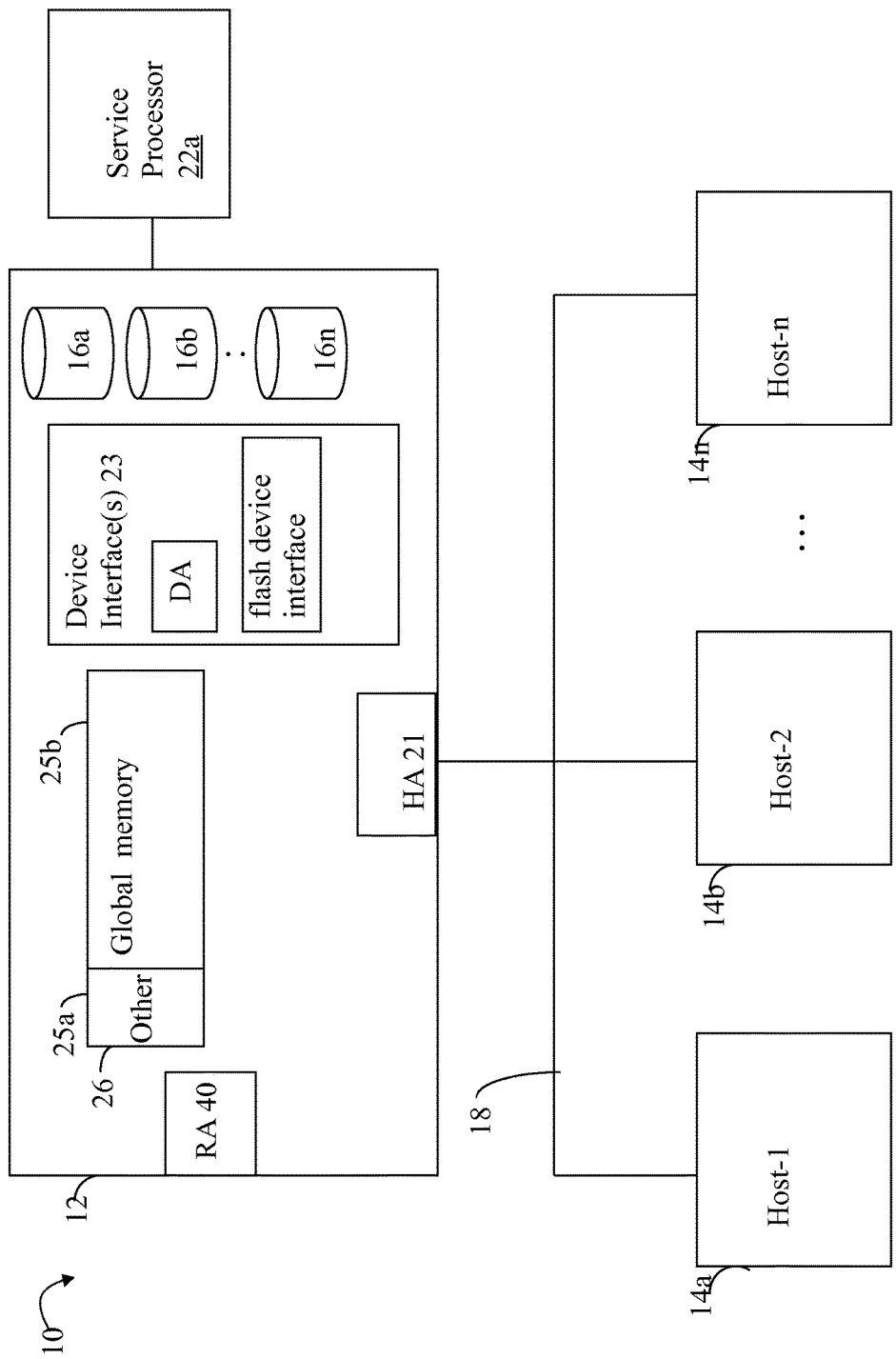
FIG. 1 is an example of an embodiment of a system that may utilize the techniques described herein.

Referring to FIG. 1, shown is an example of an embodiment of a system that may be used in connection with performing the techniques described herein. The system 10 includes a data storage system 12 connected to host systems 14a-14n through communication medium 18. In this embodiment of the computer system 10, and the n hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be the Internet, an intranet, network (including a Storage Area Network (SAN)) or other wireless or other hardwired connection(s) by which the host systems 14a-14n may access and communicate with the data storage system 12, and may also communicate with other components included in the system 10.

Each of the host systems 14a-14n and the data storage system 12 included in the system 10 may be connected to the communication medium 18 by any one of a variety of connections as may be provided and supported in accordance with the type of communication medium 18. The processors included in the host computer systems 14a-14n may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage system 12 are described herein in more detail, and may vary with each particular embodiment. Each of the host computers 14a-14n and data storage system may all be located at the same physical site, or, alternatively, may also be located in different physical locations. Examples of the communication medium that may be used to provide the different types of connections between the host computer systems and the data storage system of the system 10 may use a variety of different communication protocols such as SCSI, Fibre Channel, iSCSI, and the like. Some or all of the connections by which the hosts and data storage system may be connected to the communication medium may pass through other communication devices, such switching equipment that may exist such as a phone line, a repeater, a multiplexer or even a satellite.

Each of the host computer systems may perform different types of data operations in accordance with different types of tasks. In the embodiment of FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12.

It should be noted that although element 12 is illustrated as a single data storage system, such as a single data storage array, element 12 may also represent, for example, multiple data storage arrays alone, or in combination with, other data storage devices, systems, appliances, and/or components having suitable connectivity, such as in a SAN, in an embodiment using the techniques herein. It should also be noted that an embodiment may include data storage arrays or other components from one or more vendors. In subsequent examples illustrated the techniques herein, reference may be made to a single data storage array by a vendor, such as by EMC Corporation of Hopkinton, Mass. However, as will be appreciated by those skilled in the art, the techniques herein are applicable for use with other data storage arrays by other vendors and with other components than as described herein for purposes of example.

The data storage system 12 may be a data storage array including a plurality of data storage devices 16a-16n. The data storage devices 16a-16n may include one or more types of data storage devices such as, for example, one or more disk drives and/or one or more solid state drives (SSDs). An SSD is a data storage device that uses solid-state memory to store persistent data. An SSD using SRAM or DRAM, rather than flash memory, may also be referred to as a RAM drive. SSD may refer to solid state electronics devices as distinguished from electromechanical devices, such as hard drives, having moving parts. Flash devices or flash memory-based SSDs are one type of SSD that contains no moving parts. As described in more detail in following paragraphs, the techniques herein may be used in an embodiment in which one or more of the devices 16a-16n are flash drives or devices. More generally, the techniques herein may also be used with any type of SSD although following paragraphs may make reference to a particular type such as a flash device or flash memory device.

The data storage array may also include different types of adapters or directors, such as an HA 21 (host adapter), RA 40 (remote adapter), and/or device interface 23. Each of the adapters may be implemented using hardware including a processor with local memory with code stored thereon for execution in connection with performing different operations. The HAs may be used to manage communications and data operations between one or more host systems and the global memory (GM). In an embodiment, the HA may be a Fibre Channel Adapter (FA) or other adapter which facilitates host communication. The HA 21 may be characterized as a front end component of the data storage system which receives a request from the host. The data storage array may include one or more RAs that may be used, for example, to facilitate communications between data storage arrays. The data storage array may also include one or more device interfaces 23 for facilitating data transfers to/from the data storage devices 16a-16n. The data storage interfaces 23 may include device interface modules, for example, one or more disk adapters (DAs) (e.g., disk controllers), adapters used to interface with the flash drives, and the like. The DAs may also be characterized as back end components of the data storage system which interface with the physical data storage devices.

One or more internal logical communication paths may exist between the device interfaces 23, the RAs 40, the HAs 21, and the memory 26. An embodiment, for example, may use one or more internal busses and/or communication modules. For example, the global memory portion 25b may be used to facilitate data transfers and other communications between the device interfaces, HAs and/or RAs in a data storage array. In one embodiment, the device interfaces 23 may perform data operations using a cache that may be included in the global memory 25b, for example, when communicating with other device interfaces and other components of the data storage array. The other portion 25a is that portion of memory that may be used in connection with other designations that may vary in accordance with each embodiment.

The particular data storage system as described in this embodiment, or a particular device thereof, such as a disk or particular aspects of a flash device, should not be construed as a limitation. Other types of commercially available data storage systems, as well as processors and hardware controlling access to these particular devices, may also be included in an embodiment.

Host systems provide data and access control information through channels to the storage systems, and the storage systems may also provide data to the host systems also through the channels. The host systems do not address the drives or devices 16a-16n of the storage systems directly, but rather access to data may be provided to one or more host systems from what the host systems view as a plurality of logical devices, logical volumes (LVs) which may also referred to herein as logical units (e.g., LUNs). A logical unit (LUN) may be characterized as a disk array or data storage system reference to an amount of disk space that has been formatted and allocated for use to one or more hosts. A logical unit may have a logical unit number that is an I/O address for the logical unit. As used herein, a LUN or LUNs may refer to the different logical units of storage which may be referenced by such logical unit numbers. The LUNs may or may not correspond to the actual or physical disk drives or more generally physical storage devices. For example, one or more LUNs may reside on a single physical disk drive, data of a single LUN may reside on multiple different physical devices, and the like. Data in a single data storage system, such as a single data storage array, may be accessed by multiple hosts allowing the hosts to share the data residing therein. The HAs may be used in connection with communications between a data storage array and a host system. The RAs may be used in facilitating communications between two data storage arrays. The DAs may be one type of device interface used in connection with facilitating data transfers to/from the associated disk drive(s) and LUN (s) residing thereon. A flash device interface may be another type of device interface used in connection with facilitating data transfers to/from the associated flash devices and LUN(s) residing thereon. It should be noted that an embodiment may use the same or a different device interface for one or more different types of devices than as described herein.

In an embodiment, the data storage system as described may be characterized as having one or more logical mapping layers in which a logical device of the data storage system is exposed to the host whereby the logical device is mapped by such mapping layers of the data storage system to one or more physical devices. Additionally, the host may also have one or more additional mapping layers so that, for example, a host side logical device or volume is mapped to one or more data storage system logical devices as presented to the host.

The device interface, such as a DA, performs I/O operations on a physical device or drive 16a-16n. In the following description, data residing on a LUN may be accessed by the device interface following a data request in connection with I/O operations that other directors originate. For example, a host may issue an I/O operation which is received by the HA 21. The I/O operation may identify a target location from which data is read from, or written to, depending on whether the I/O operation is, respectively, a read or a write operation request. The target location of the received I/O operation may be expressed in terms of a LUN and logical address or offset location (e.g., LBA or logical block address) on the LUN. Processing may be performed on the data storage system to further map the target location of the received I/O operation, expressed in terms of a LUN and logical address or offset location on the LUN, to its corresponding physical device (PD) and location on the PD. The DA which services the particular PD may further perform processing to either read data from, or write data to, the corresponding physical device location for the I/O operation.

Also shown in FIG. 1 is a service processor 22a that may be used to manage and monitor the system 12. In one embodiment, the service processor 22a may be used in collecting performance data, for example, regarding the I/O performance in connection with data storage system 12. This performance data may relate to, for example, performance measurements in connection with a data request as may be made from the different host computer systems 14a 14n. This performance data may be gathered and stored in a storage area. Alternatively, an embodiment may provide for collection of such performance data using processor(s) and other components which are internal to the data storage system.

It should be noted that a service processor 22a may exist external to the data storage system 12 and may communicate with the data storage system 12 using any one of a variety of communication connections. In one embodiment, the service processor 22a may communicate with the data storage system 12 through three different connections, a serial port, a parallel port and using a network interface card, for example, with an Ethernet connection. Using the Ethernet connection, for example, a service processor may communicate directly with DAs and HAs within the data storage system 12.

It should be noted that each of the different adapters, such as HA21, DA or disk interface, RA, and the like, may be implemented as a hardware component including, for example, one or more processors, one or more forms of memory, and the like. Code may be stored in one or more of the memories of the component for performing processing described herein in following paragraphs as well other suitable processing.

Figure 2:
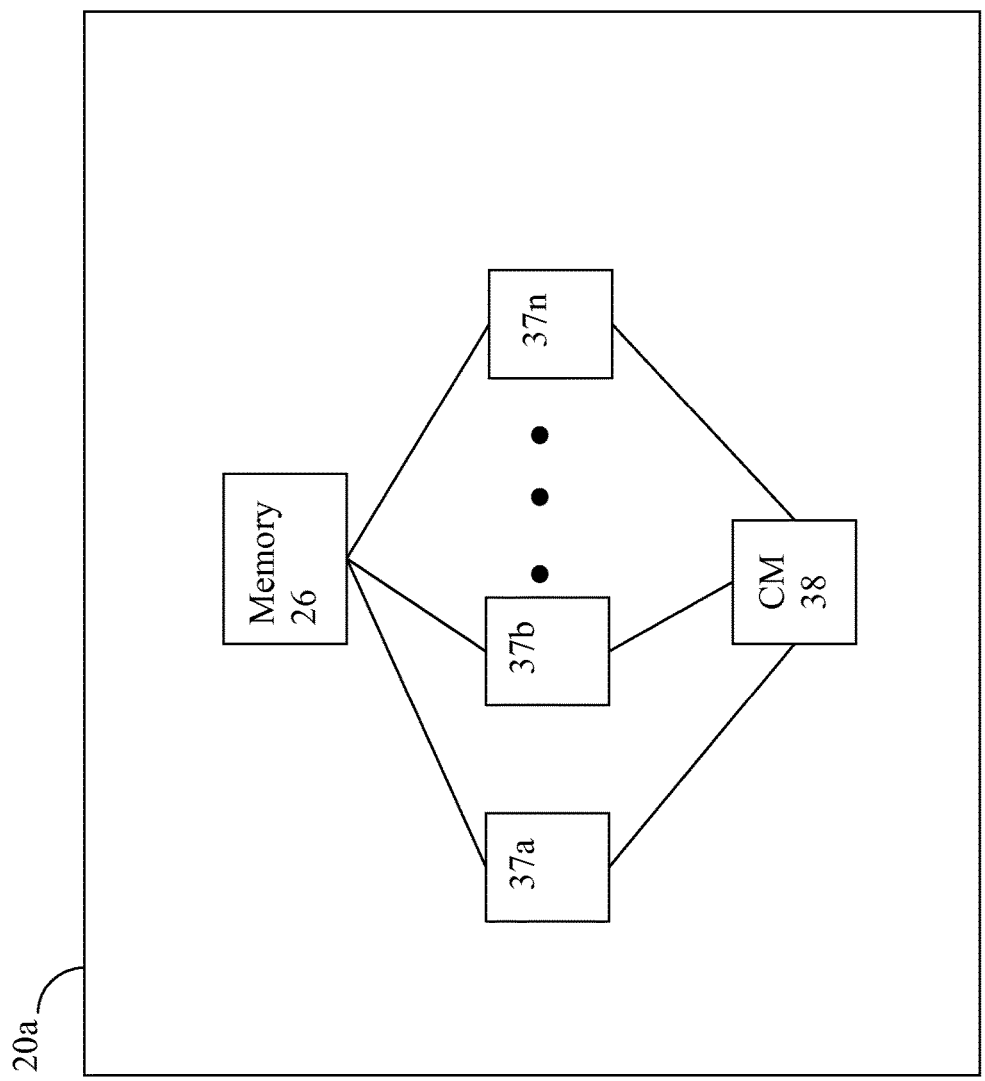
FIG. 2 is a representation of the logical internal communications between the directors and memory included in one embodiment of a data storage system of FIG. 1.

Referring to FIG. 2, shown is a representation of the logical internal communications between the directors and memory included in a data storage system. Included in FIG. 2 is a plurality of directors 37a-37n coupled to the memory 26. Each of the directors 37a-37n represents one of the HAs, RAs, or device interfaces that may be included in a data storage system. In an embodiment disclosed herein, there may be up to sixteen directors coupled to the memory 26. Other embodiments may allow a maximum number of directors other than sixteen as just described and the maximum number may vary with embodiment.

The representation of FIG. 2 also includes an optional communication module (CM) 38 that provides an alternative communication path between the directors 37a-37n. Each of the directors 37a-37n may be coupled to the CM 38 so that any one of the directors 37a-37n may send a message and/or data to any other one of the directors 37a-37n without needing to go through the memory 26. The CM 38 may be implemented using conventional MUX/router technology where a sending one of the directors 37a-37n provides an appropriate address to cause a message and/or data to be received by an intended receiving one of the directors 37a-37n. In addition, a sending one of the directors 37a-37n may be able to broadcast a message to all of the other directors 37a-37n at the same time.

With reference back to FIG. 1, components of the data storage system may communicate using GM 25b. For example, in connection with a write operation, an embodiment may first store the data in cache included in a portion of GM 25b, mark the cache slot including the write operation data as write pending (WP), and then later de-stage the WP data from cache to one of the devices 16a-16n. In connection with returning data to a host from one of the devices as part of a read operation, the data may be copied from the device by the appropriate device interface, such as a DA servicing the device. The device interface may copy the data read into a cache slot included in GM which is, in turn, communicated to the appropriate HA in communication with the host.

As described above, the data storage system 12 may be a data storage array including a plurality of data storage devices 16a-16n in which one or more of the devices 16a-16n are flash memory devices employing one or more different flash memory technologies. In one embodiment, the data storage system 12 may be a Symmetrix® DMX™ or VMAX™ data storage array by EMC Corporation of Hopkinton, Mass. In the foregoing data storage array, the data storage devices 16a-16n may include a combination of disk devices and flash devices in which the flash devices may appear as standard Fibre Channel (FC) drives to the various software tools used in connection with the data storage array. The flash devices may be constructed using nonvolatile semiconductor NAND flash memory. The flash devices may include one or more SLC (single level cell) devices and/or MLC (multi level cell) devices.

It should be noted that the techniques herein may be used in connection with flash devices comprising what may be characterized as enterprise-grade or enterprise-class flash drives (EFDs) with an expected lifetime (e.g., as measured in an amount of actual elapsed time such as a number of years, months, and/or days) based on a number of guaranteed write cycles, or program cycles, and a rate or frequency at which the writes are performed.

In connection with performing I/O operations, such as writes as well as reads, a data storage system in an embodiment in accordance with techniques herein may use a cache in order to improve performance.

Figure 3:
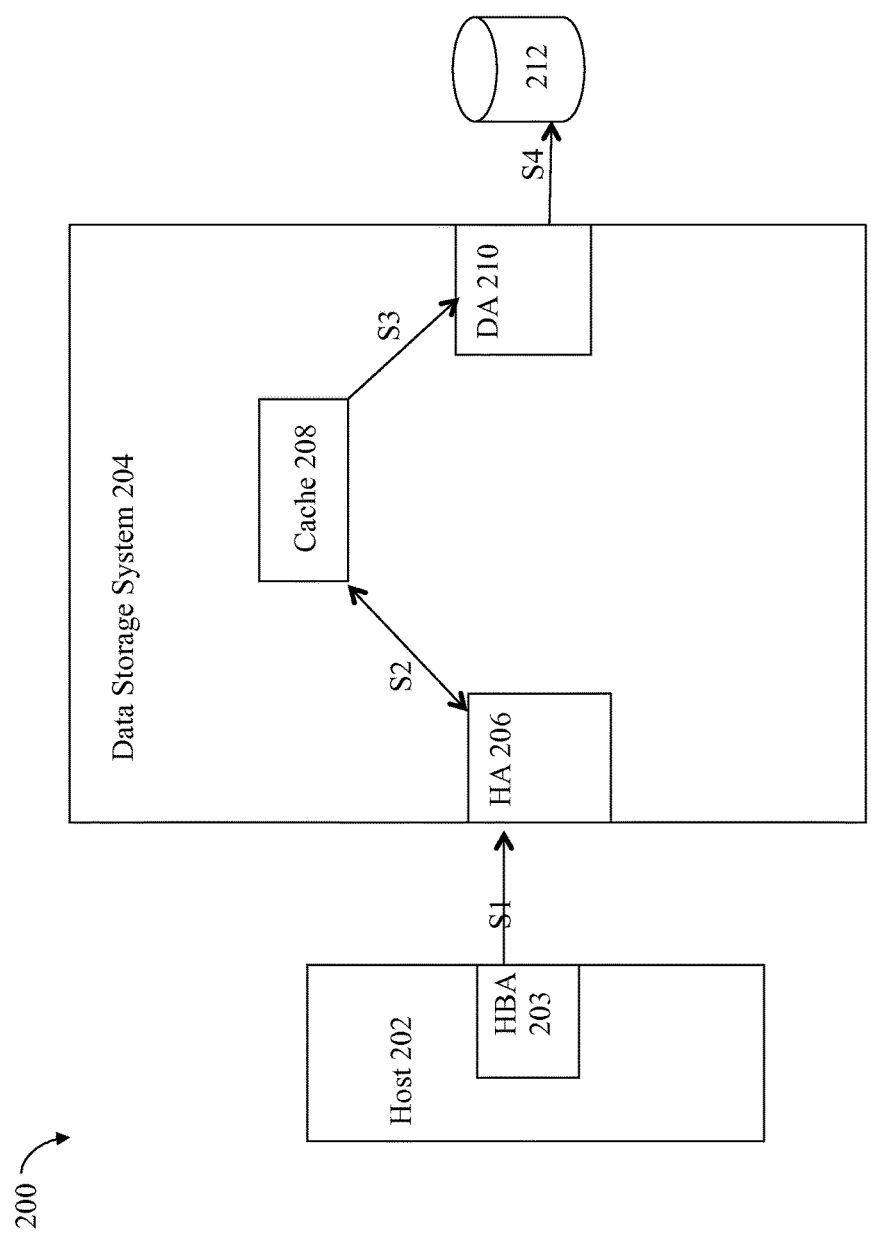
FIGS. 3 and 4 are examples illustrating processing that may be performed in connection servicing I/O operations on the data storage system in an embodiment in accordance with techniques herein.

Referring to FIG. 3, shown is an example illustrating processing of a write I/O operation received at the data storage system in an embodiment in accordance with techniques herein, whereby a host may issue the write operation. The example 200 includes host 202 and data storage system 204. The host 202 includes host bus adapter (HBA) 203 having one or more ports used for communicating with the data storage system 204. The data storage system 204 includes a front end component, HA 206, which receives I/Os from the host 202. The data storage system 204 also includes DA 210, cache 208 and physical storage device 212, such as a disk drive. Generally, the host 202 and data storage system 204 may include components as described in more detail in connection with other figures herein. Details of other components of 202, 204, and connections therebetween, have been omitted for simplicity of illustration. The cache 208 may be a global cache used by and between the different components of the system 204, such as by the HAs, DAs, and other components of the system 204 as described herein. Thus, data in the cache 208 may be read from, and/or written to, by different components of the system 204 such as for use with techniques herein as well as other purposes that may vary with embodiment. In one embodiment such as illustrated in the example 200, the cache 208 may be a portion of global memory of the data storage system 204 whereby cache 208 is used as a data cache for data that is read from and/or written to physical storage such as in connection with I/O operations received from the host 202 at the data storage system 204. In following paragraphs and illustrated in FIG. 3 is processing performed for a write operation.

In step S1, the host 202 may issue a write request over a port of its HBA 203 where the write request is received by the HA 206 of the data storage system 204. In a step S2, the HA 206 may store the write operation data in cache 208 and mark the cache slot or cache location as write pending (WP) thereby denoting the cache slot includes write data that needs to be written to physical storage. In some embodiments, the data storage system may return a response to the host indicating that the write operation has been completed successfully following S2 once the write data has been stored in the cache 208. Once the write data has been stored in cache 208 in step S2, processing may be performed at some time later to destage the write data from cache 208 to the physical drive 212. Thus, in a step S3, the DA 210 may obtain the write data from cache 208 and then store the write data in step S4 at the appropriate location on the physical device 212. Although not described herein and as will be appreciated by those skilled in the art, other processing may be performed in connection with processing the write operation such as, for example, setting the cache slot location to no longer indicate WP once the write data is written to physical storage in step S4.

Figure 4:
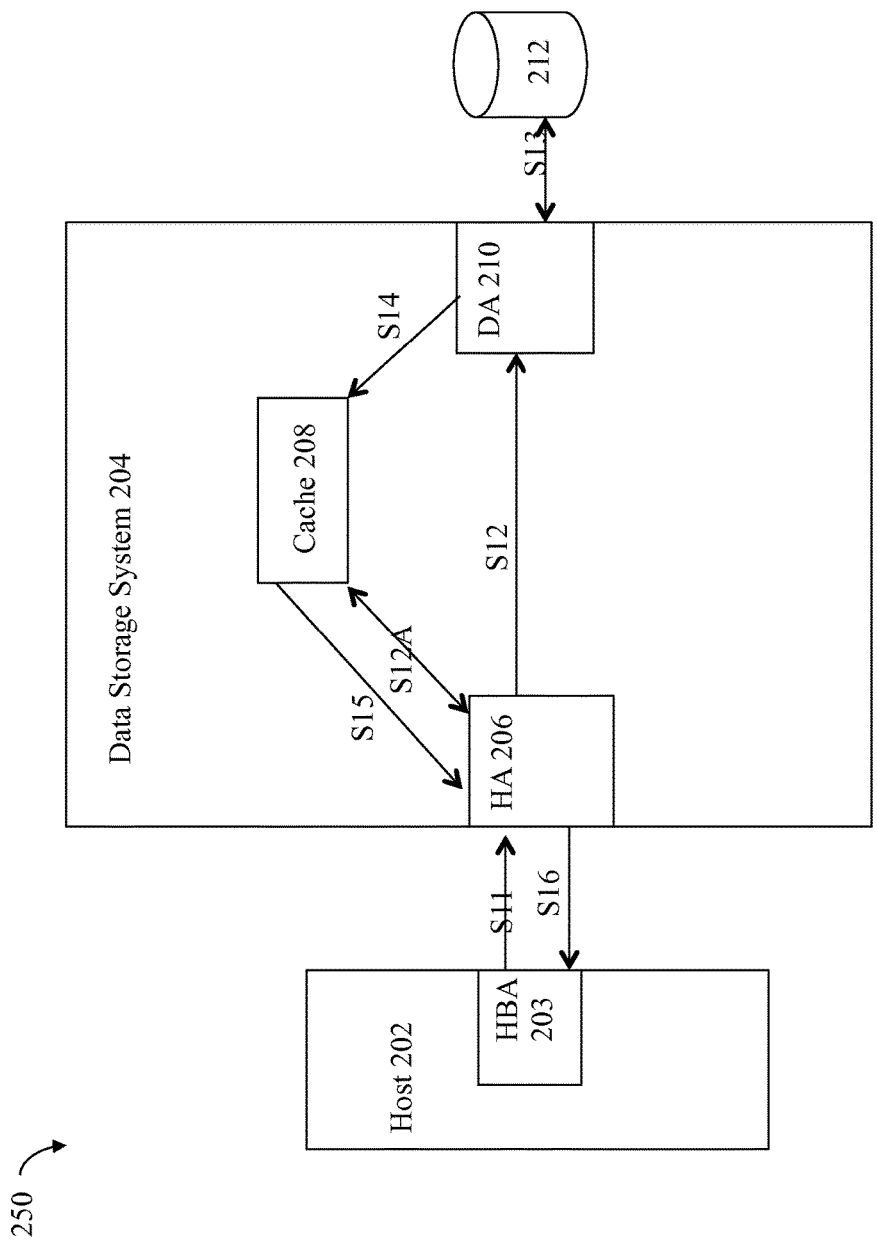

Referring to FIG. 4 shown is an example illustrating processing of a read I/O operation received at the data storage system, in an embodiment in accordance with techniques herein, whereby a host may issue the read operation. The example 250 includes host 202, data storage system 204, and components similarly numbered and as described elsewhere herein.

As a first step S11, the host 202 sends the read request to the data storage system 204. The read request may be received by HA 206. The HA 206 determines whether all the requested read data is in cache 208 thereby indicating that the read request is a read hit, or otherwise, that the read request is a read miss. If the read request is a read hit indicating that the read request may be serviced using data already in cache 208, the HA 206 retrieves the read request data from the cache 208 in step S12A and returns the requested read data to the host 202 in step S16. Alternatively, if the read request is a read miss, processing may be performed to retrieve the data from physical storage, store the requested read data in cache, and then return the cached read data to the host. In connection with read miss processing, the HA 206 may request S12 that a back-end component, such as the DA 210, retrieve the requested data from physical storage device 212. It should be noted that in performing S12, whereby the HA 206 issues the request for the DA 210 to retrieve the requested read data, such a request may be communicated or issued to the DA 210, directly or indirectly, in any suitable manner that may vary with the embodiment of the data storage system. For example, the request may be communicated indirectly, such as through global memory, communicated directly from the HA to the DA such as a through a messaging layer and associated fabric, and the like. In any case, the DA 210 retrieves the requested read data from physical storage device 212 in step S13. The DA 210 may store the read data in cache 208 in step S14. The HA 206 may then retrieve the read data in step S5 from the cache 208 and then return the requested read data (as retrieved from cache) to the host 202 in step S16.

Requests to read and/or write data, such as for I/O operations received by an HA from the host, identify a location of where data is read from or written to, where such location is expressed in terms of a LUN and LUN offset (e.g., LBA or logical block address) in the LUN's logical address space. Data for the LUN and LUN offset is stored at a physical storage location on a physical device (PD). Thus, the LUN and LUN offset may be mapped by the data storage system to a physical device (PD) and location on that PD when reading data from and/or writing data to that LUN and LUN offset. For example, a DA may map the LUN and LUN offset to a corresponding PD and location on the PD.

The cache, like other data storage system resources, may be a finite resource whereby the data storage system may have a limited amount of cache for storing user data in connection with servicing read and/or write operations, such as described above. There may be times when data cache consumption for storing WP data in a data storage system may reach an undesirable level and processing may be performed to destage WP data from cache to physical storage. Described in following paragraphs are techniques that may be used to determine an order or priority in which WP data included in cache pages is destaged from cache. As noted above, destaging includes writing out WP data from cache to a physical storage device, such as a physical drive.

As described in more detail in following paragraphs, the size of a single unit of cache data may be referred to herein as a page. The size of a page may vary with embodiment. Thus the granularity or amount of data to be destaged in a single destaging operation may vary with embodiment. In one exemplary embodiment, the size of a page denoting an amount of data that can be destaged from cache as a single unit may be 42 tracks (e.g., each track may be, for example, 128K bytes of data). In a single cache page, not all the data of the single cache page may be WP data. For example, within a single cache page, it may be that one or more portions of the page include WP data as well as non-WP data. For example, the cache page may include non-WP data that includes data read from a physical device and stored in the cache page in connection with servicing a read miss operation. Additionally, one or more portions of the same cache page including WP data may be empty and contain no data.

Figure 5:
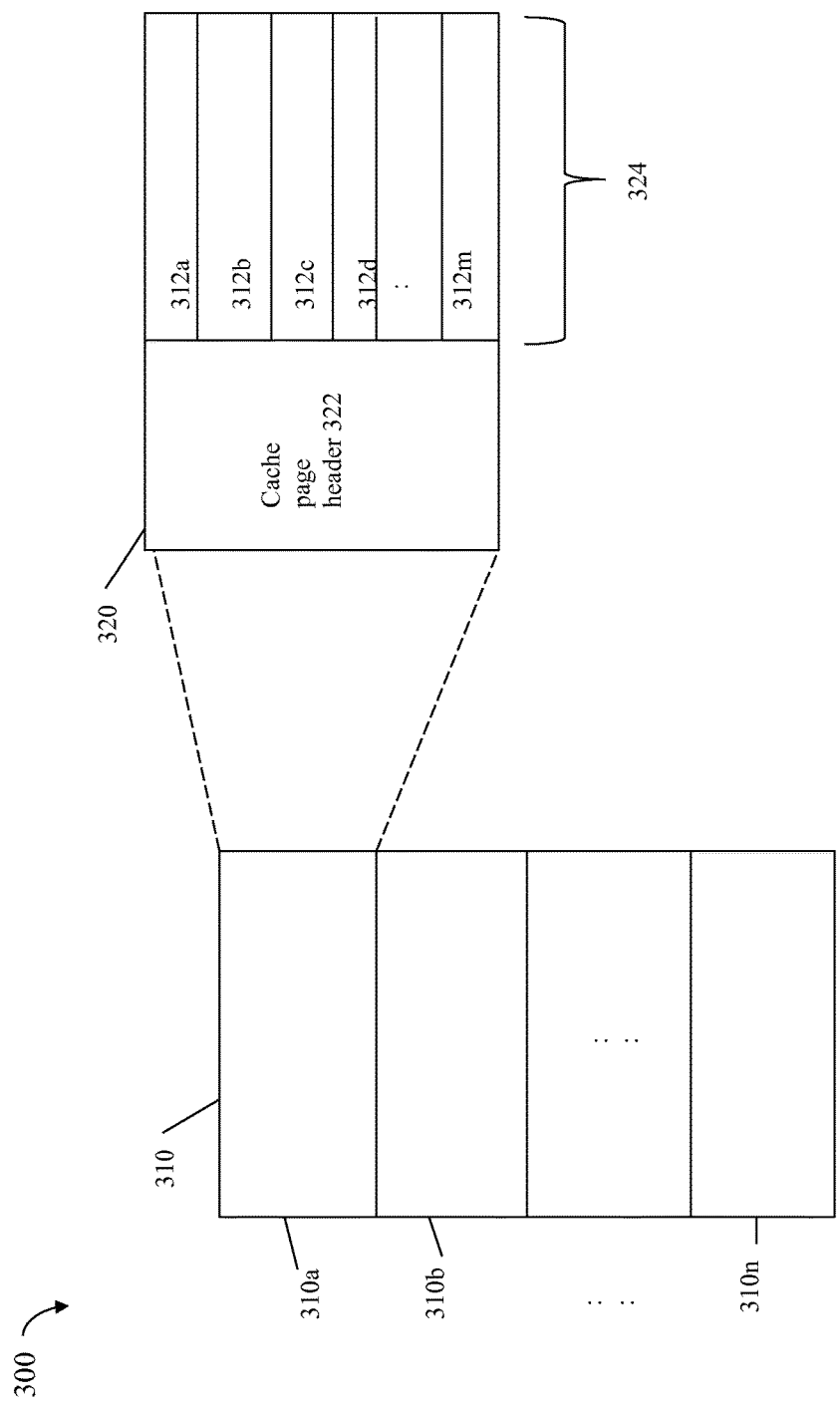
FIG. 5 is an example illustrating a logical representation of a data cache that may be used in an embodiment in accordance with techniques herein.

Referring to FIG. 5, shown is an example illustrating a logical representation of a data cache that may be used in an embodiment in accordance with techniques herein. In the example 300, element 310 may represent the memory or storage used as the data cache which is partitioned into cache pages 310a-310n. It should be noted that the example 300 is a logical representation of a cache that may be implemented using any suitable data structure(s) known in the art. As described elsewhere herein, each of the cache pages 310a-n may contain varying amounts of WP data. Element 320 provides additional detail of single cache page 320. Cache page 320 may include a cache page header 322 and cache page data 324. The cache page data 324 illustrates that a single cache page of data may further include multiple portions 312a-m each of which may or may not include WP data and each of which may or may not include any cached data. The cache page header 322 may include additional information, such as metadata, regarding the cached data stored in 324. For example, the header 322 may denote whether the data cached in each of the portions 312a-m is WP data.

Although not illustrated in FIG. 5 for simplicity and as known by those of ordinary skill in the art, an embodiment may store additional information for each of the cache pages regarding the data stored in each such page. For example, for a particular LUN and offset, such additional information may map the particular LUN and offset to a cache location containing the data for that LUN and offset. Such additional information may also, for example, map a particular PD and PD offset to a cache location containing the data for that PD and offset. Generally, such additional information may be stored in any suitable location and used, for example, by the HA, DA and other data storage system components and executing code, as an index to map into the data cache 310 to retrieve and/or store data from the cache. For example, the HA may manage and/or use information mapping a LUN and LUN offset to a cache location including data stored at the LUN offset on the particular LUN. The DA may manage and/or use information mapping a PD and offset on the PD to a cache location including data stored at the offset on the particular PD.

In a single cache page such as 310a (illustrated in more detail by 320), not all the data of the single cache page may be WP data. For example, within a single cache page, it may be that one or more portions 312a-m of the page 320 include WP data as well as non-WP data. For example, the cache page 320 may include non-WP data in 312a and 213c (e.g., 312a and 312c may include data read from a physical device and stored in the cache page in connection with servicing a read miss operation). Additionally, one or more portions 312a-m of the same cache page 320 including WP data may be empty and contain no data. For example, all of page 320 may include WP data except for 312a-b which may contain no cached data.

It should be noted that each portion 312a-m of a cache page may correspond, for example, to a track or other storage size unit. In an embodiment having a cache page size of 42 tracks, "m" denoting the number of portions in a single cache page 320 may be 42. For each track of a cache page, some or all data of a single track may be stored in cache since the size unit for reading and writing data may be less than a track. In connection with determining a current amount of the data 310 cache that is consumed for WP data, only those one or more portions 312a-m of each cache page 310a-n including WP data are considered. The current amount of cache data consumed for storing WP data may be expressed in units of granularity such as at the track level represented by each of 312a-m. If any single track, or more generally, single data portion (e.g., one of 312a-m) includes any WP data, the track may be counted as consumed for storing WP data.

The cache, like other data storage system resources, may be a finite resource whereby the data storage system may have a limited amount of cache for storing user data in connection with servicing read and/or write operations, such as described above. A cache location including WP data cannot be overwritten or reused until the WP data has been written out to physical storage. Thus, the data storage system may destage data from cache at various points in time. In one embodiment, the frequency with which WP data is destaged may vary in accordance with how much of the data cache is consumed for storing WP data. In one embodiment, a process may be executed to perform WP data cache destaging. An embodiment may define a threshold amount of cache consumed for storing WP data. For example, the threshold amount may be a percentage of the data cache such as 75% or 80%. This particular threshold amount may be referred to as the system WP (SWP) limit. In some embodiments, the SWP limit may be configurable. The process performing the destaging may monitor the amount of cache consumed for WP data and the process may be scheduled to run at different points in time for an amount of time. The frequency with which the process is executed and/or the amount of time the process performing the destaging is executed may increase as the amount of data cache consumed for storing WP data approaches the SWP limit. The goal of such destaging is to reduce the amount of cache consumed for WP data thereby making the cache storage of the destaged WP data available, such as for storing other write data of write operations received after the destaging is performed. Thus, the closer the amount of consumed data cache for storing WP data is to the SWP limit, the more aggressive the destaging. The aggressiveness of the destaging may be increased by, for example, increasing the amount of time the above-mentioned process executes each time and/or increasing the frequency at which the process is executed. It should be noted that the foregoing is an example of one type of trigger event that may affect the rate or frequency at which data is destaged from cache to physical storage. Other examples of trigger events are described elsewhere herein. An embodiment may perform destaging techniques described herein in response to trigger events described herein as well others that may vary with embodiment.

In connection with destaging data, each single destaging operation may operate on data stored in a single cache page. Thus, for a single destage operation in which a single cache page is 42 tracks, a maximum of 42 tracks of WP data is destaged from cache to physical storage (e.g., if the single cache page is full and includes only WP data). If the single cache page does not include 42 tracks of WP data, the destaging of the cache page results in destaging only those data portions of the page which are WP. Due to various RAID configurations and overhead (e.g., such as for determining and storing parity information for RAID-5 groups) incurred when performing writes of data in such RAID groups, it is most efficient to destage a cache page when full of data (e.g., contains all 42 track of data). However, it may be the case that destaging is performed, such as responsive to a trigger event, when there is no such cache page that is completely full of data. As such, it may be desirable to use techniques described herein to facilitate selecting and prioritizing cache pages for destaging. Such techniques prioritize cache pages in an order for destaging taking into account various factors or characteristics of cached data in the pages to optimize backend data storage performance. Such techniques provide for prioritizing cache pages which may not be completely full of data (WP data or otherwise).

Figure 6:
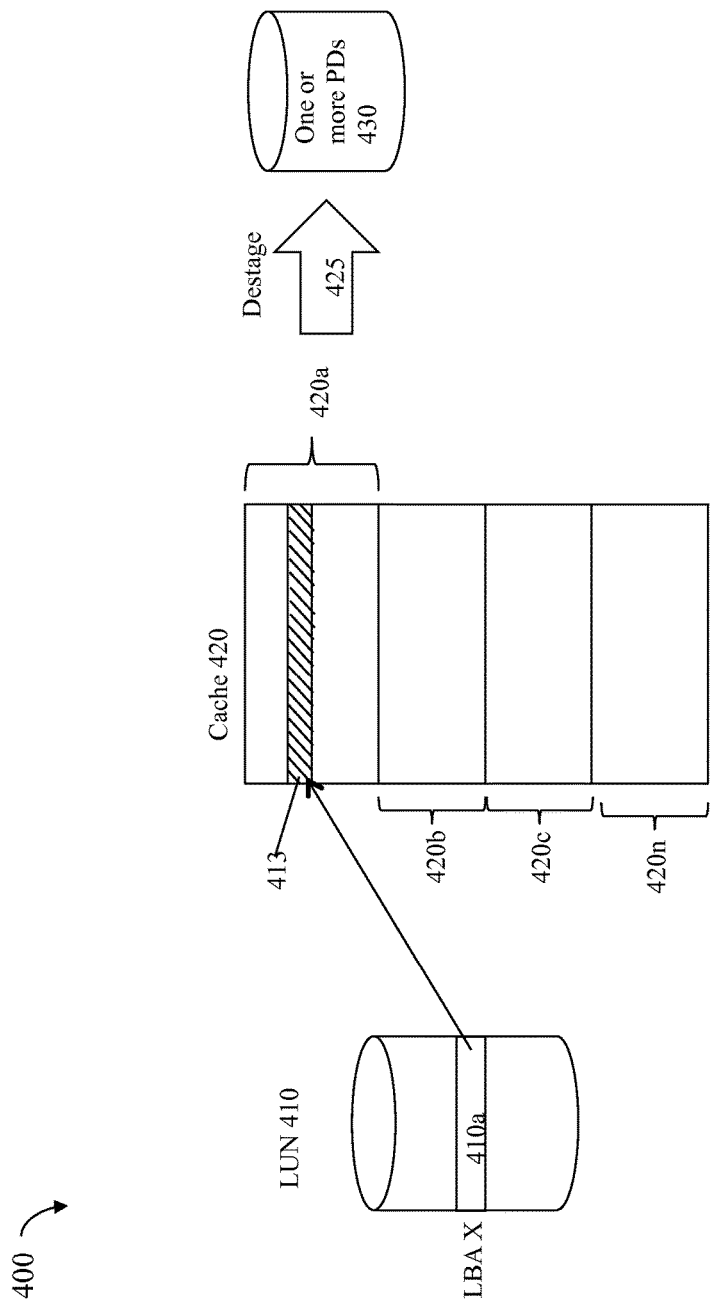
FIG. 6 is an example illustrating use of a data cache in connection with a write operation in an embodiment in accordance with techniques herein.

Referring to FIG. 6, shown is an example illustrating different views of cached data in an embodiment in accordance with techniques herein. The example 400 includes LUN 410, cache 420 and one or more PDs 430. Cache 420 may include cache pages 420a-n. Cache 420 may be a data cache similar to that as described elsewhere herein (e.g., element 310 of FIG. 5 and element 208 of FIGS. 3 and 4). An HA may receive a write operation to store write data at a LUN offset or LBA X of LUN 410. Element 410a may denote the write data written to LBA X of LUN 410. The HA may write the data 410a to cache location 413 included in cache page 420a of cache 420 whereby cache location 413 may be marked as containing WP data. The foregoing use and mapping of LUNs/LBA to cache may be characterized as the HA or front end component view where the HA uses data storage locations expressed in terms of LUNs and LBAs.

At a later point in time after write data 410a is placed in the cache at location 413, a DA may destage 425 data from cache page 420a to one or more PDs 430. For destaging, the DA operates on single cache pages destaging data of the single cache page 420a. The foregoing use and mapping of cache to PD/PD location may be characterized as the DA or backend component view where the DA uses data storage locations expressed in terms of PDs and PD locations.

Each cache page may include data stored at logically contiguous sequential LBA locations (e.g., each cache page corresponds or maps to a contiguous, consecutive LBA range of a LUN). For example, assuming a cache page size of 42 tracks, cache page 420a may include data stored on tracks 0-41 of LUN 410.

Although only a single LUN is illustrated, there may be I/Os directed to many different LUNs. When destaging WP data responsive to an occurrence of a trigger event such as when the current amount of consumed cache for WP data approaches the SWP limit, it may not matter which one or more LUNs have the most WP data currently stored in cache. Techniques herein may select data for destaging in such a case in accordance with the DA view of storage as related to PDs independent of which one or more LUNs have consumed the most cache for storing WP data (e.g., without considering to which one or more LUNs such WP data in cache is directed).

Responsive to an occurrence of one or more trigger events (e.g., where one such trigger event may be reaching or approaching the SWP limit), processing may be performed to destage WP data from cache to physical storage.

Generally, such techniques that will now be described consider factors to select a cache page from multiple candidate cache pages, each including WP data for destaging, where the particular cache page selected maximizes backend write destaging performance of all candidate cache pages. A cache page may be selected based on a weighting function whereby the selected cache page achieves the maximum write destaging performance. It should be noted that such performance for destaging WP data from cache to physical storage is dependent on the RAID (redundant array of independent disks) group configurations. A RAID group and various RAID configurations are known in the art. A RAID group configuration uses multiple physical devices to provide a combination of fault tolerance and/or improved performance for data storage devices. For example, RAID-5 techniques can be used in connection with a data storage system to protect from a single device failure with block level striping and distributed parity information, and RAID-6 provides protection from two devices of the RAID group failing with two sets of distributed parity and block level striping. The particular RAID levels described herein are merely exemplary and not a limitation of the techniques described herein.

Figure 7:
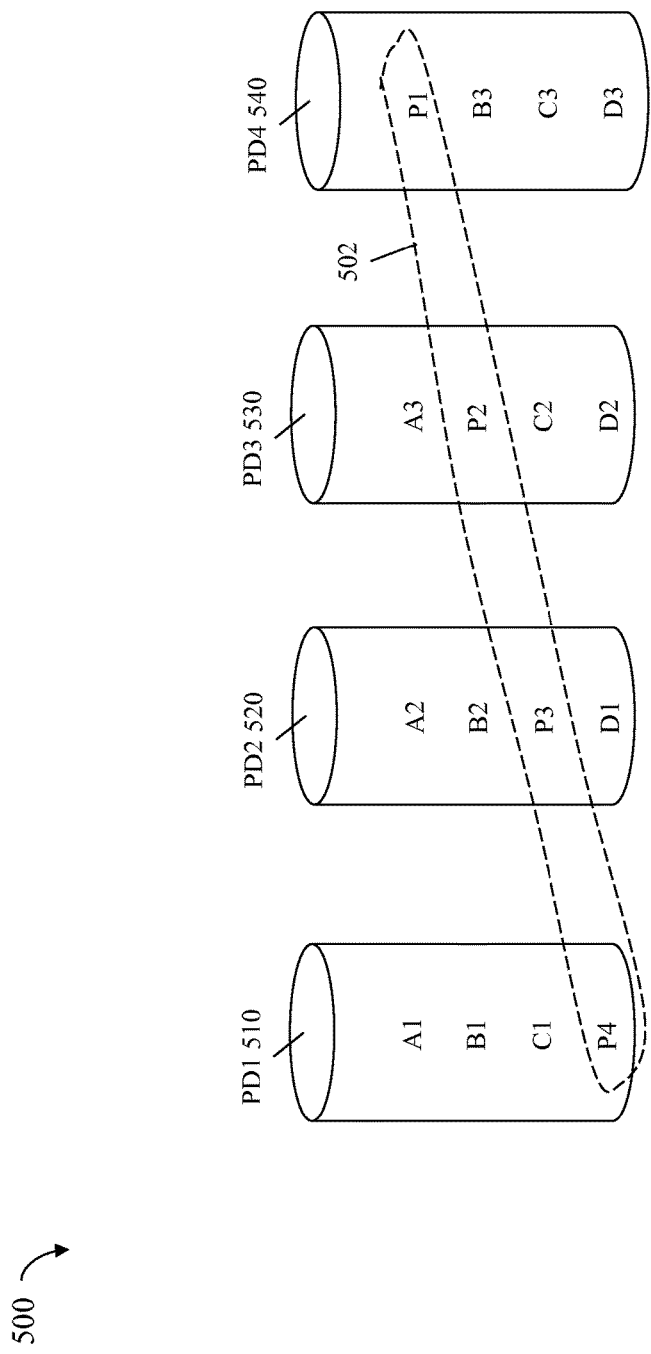
FIG. 7 is an example illustrating a RAID group configuration of physical devices that may be included in an embodiment in accordance with techniques herein.

For example, with reference to FIG. 7, consider an example 500 that is a RAID-5 group of 3 data devices and 1 parity device. Such a RAID group includes 4 PDs 510, 520, 530 and 540, having a layout where the parity information, P1-P4, is distributed across the various PDs. User data and parity information may be striped across the 4 PDs in rows or stripes as illustrated. For example, a first row may include data A1, A2 and A3 with corresponding parity information P1, a second row may include data B1, B2 and B3 with corresponding parity information P2, a third row may include data C1, C2 and C3 with corresponding parity information P3, and a fourth row may include data D1, D2 and D3 with corresponding parity information P4. When a write is performed to store data on one of the data devices, such as write A1, the parity information P1 is also updated. To calculate parity information P1, user data A1, A2 and A3 of the same row must be read. Thus, in order to write data A1 of a single PD, data portions A2 and A3 in the same row are needed thereby incurring additional reads of A2 and A3 to recalculate the parity P1 when writing data A1. In this manner, if the cache page including WP data for A1 also already includes data for A2 and A3, no additional reads are required to obtain the necessary data A2 and A3 to calculate the parity P1 when writing the data A1. With such in mind in embodiments with RAID group configurations, it may be desirable to select a cache page which includes a full page of data to avoid incurring additional read penalties to obtain user data, such as A2 and A3, when writing WP data for another data portion, such as A1. Additionally, techniques described in following paragraphs may use a weight function based on factors that select a cache page which may require a minimum number of such extra reads thereby maximizing the write destaging performance. Techniques described herein use various factors to select a particular cache page for destaging that maximizes destaging performance whereby the selected cache page is determined to have a minimal number of extra reads needed to recalculate parity information for WP data being destaged.

It has been determined that, for a cache page size of 42 tracks for destaging data, when the cache page is full (e.g., all 42 tracks of data in the cache), destaging such a cache page is optimal and maximizes destaging performance for many different RAID configurations supported in an embodiment.

Techniques described in following paragraphs select a cache page that is determined, using a weighting function, to achieve the maximum write destaging benefit of all cache pages whereby the number of extra reads for reading user data needed for parity information calculation is minimal. An embodiment may determine a weight, W, for each cache page based on a function defined as follows in EQUATION 1:

$$W = (N * \text{page\_WP\_time}) + (M * (\text{number\_of\_missing\_chunks\_in\_page} / \text{page\_size})) + (K * \text{gap\_sequential\_factor})$$

where

N is a weighting factor or coefficient for page_WP_time;

M is a weighting factor or coefficient of number_of_missing_chunks_in_page/page_size;

K is a weighting factor or coefficient for gap_sequential_factor;

page_WP_time is the amount of time that has elapsed since WP data was last placed in this cache page. This may be in any suitable time unit such as second, milliseconds, and the like;

number_of_missing_chunks_in_page is the number of tracks, or other data portions/units, missing from this cache page (e.g., how many tracks of this cache page are empty or do not include any data);

page_size is the total number of tracks or data portions/units in a single cache page. In the example above, each cache page may be 42 tracks so "page_size" in this case is equal to 42;

gap_sequential_factor represents the number of holes or gaps of missing data in the cache page.

It should be noted that it may be possible for less than a complete track of data, or more generally portion of data, to be included in a cache page and a determination may be made at the track level, for each track of a cache page, as to whether that track is classified as "missing" or not (e.g., whether to count the track as a missing track in the "number_of_missing_chunks_in_page"). In such an instance, an embodiment may count this track as one of the missing chunks or tracks if no data of that track is in cache. As an alternative, an embodiment may count this track as "missing" if less than the entire track of data is in cache. More generally, an embodiment may count this track as one of the missing chunks or tracks if there is less than a threshold amount of that track's data in cache (e.g., for example, if there is less than half of the track's data in cache, if there is less than the entire track of data in cache, and the like).

The weight function of EQUATION 1 may be used to calculate weight values for cache pages using a plurality of factors to assess characteristics of a cache page related to destaging performance. Generally, the higher the weight value calculated using EQUATION 1, the greater the expected destaging performance.

In connection with EQUATION 1 above, a first factor is page_WP_time to account for how long since the last WP data was placed in a cache page.

A second factor in EQUATION 1 is the ratio, number_of_missing_chunks_in_page/page_size, to account for how much data of each cache page is actually currently in cache. In the example described herein, a chunk or data portion may be a track and "number_of_missing_chunks_in_page" and "page_size" may each be integer values expressed as a number of tracks. For example, as described elsewhere herein, each cache page may be 42 tracks. For a cache page having 2 missing tracks, the second factor number_of_missing_chunks_in_page/page_size=2/42. In the above EQUATION 1, it should be noted that M may be a negative number. As an alternative, rather than have a negative value for M with number_of_missing_chunks_in_page/page_size, an embodiment may have a positive value for M and use number_of_present_chunks_in_page/page_size in EQUATION 1 rather than number_of_missing_chunks_in_page/page_size, where:

number_of_present_chunks_in_page is the number of tracks or data portions of the cache page currently in cache; and page_size is as noted above.

A third factor in EQUATION 1 is gap_sequential_factor representing the number of holes or gaps of missing data tracks in the cache page. For example, consider a cache page of 42 tracks where there are 36 tracks with data. The 46 tracks of data, or the missing data tracks, may be distributed in different ways within the single cache page. The gap_sequential_factor characterizes such a distribution or sequentiality of the missing data tracks and sequentiality of the data tracks in a cache page. Generally, the fewer the gaps or holes of missing data tracks, the higher the gap sequential factor. The larger the number of gaps or holes of missing data tracks, the lower the gap sequential factor. The larger the gap_sequential_factor for a cache page, the more logically sequential and contiguous the data is for the cache page. Generally, the higher the gap_sequential_factor, the better the performance achieved when performing destaging of the WP data from the cache page. Generally, the larger the number of holes or gaps of missing data in a cache page, the lower the gap_sequential_factor and the lower the performance achieved when performing destaging of the WP data from the cache page.

Figure 8:
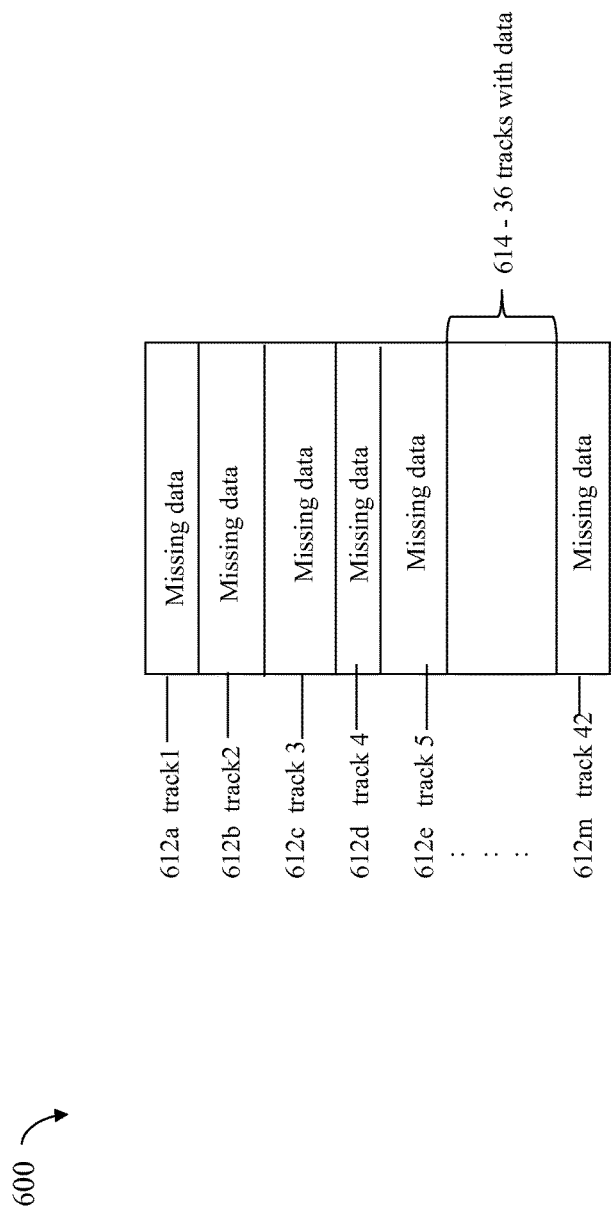
FIGS. 8 and 9 are examples illustrating partially filled cache pages that may be included in a data cache in an embodiment in accordance with techniques herein.
Figure 9:
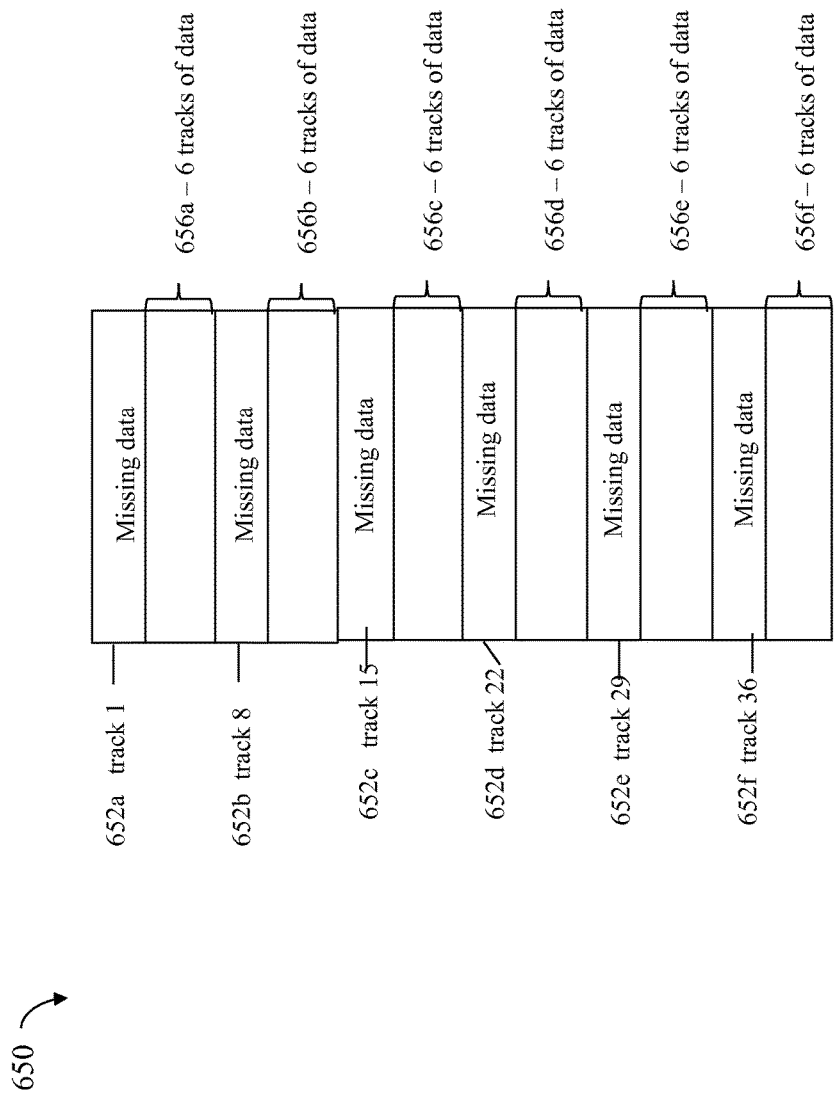

For example, with 42 tracks in a cache page and 36 tracks of the page with data, reference is now made to FIG. 8 illustrating one way in which the 36 tracks of data and missing 6 tracks of data may be distributed within the cache page. In the example 600, element 614 denotes that the 36 tracks of data are included as a single logically contiguous or sequential segment of data. As a another example, reference is made to FIG. 9 illustrating a second way in which the 36 tracks of data and missing 6 tracks of data may be distributed within the cache page. In the example 650, elements 656a-f collectively denote the 36 tracks of data in the cache page where each of 656a-f denote a logically contiguous or sequential 6 track segment of data in the cache page. As noted above, given the same number of missing tracks in the cache pages of 600 and 650, the fewer the gaps or holes of missing data tracks, the higher the gap sequential factor, and the larger the number of gaps or holes of missing data tracks, the lower the gap sequential factor. Thus, whereby the example 600 of FIG. 8 has less missing data holes or gaps than the example 650 of FIG. 9, the arrangement or distribution of missing data tracks of FIG. 8 has a higher gap sequential factor than the arrangement or distribution of missing data tracks of FIG. 9. In one embodiment, the gap_sequential_factor may be an integer value expressed as:

$$\text{gap\_sequential\_factor} = \#\text{chunks\_in\_page} - \#\text{holes} \quad \text{EQUATION 2}$$

where chunks_in_page is the number of chunks or tracks (data portions) in the cache page; and holes is the number of missing data holes or gaps in the cache page, where each gap or hole may include one or more missing tracks of data of the cache page.

In the examples of FIGS. 8 and 9, # chunks_in_page is 42. With reference to FIG. 8, #holes may be determined as 1 thereby making the gap_sequential factor as expressed in EQUATION 2, for the cache page of FIG. 8, 42−1=41. With reference to FIG. 9, #holes may be 6 thereby making the gap_sequential_factor as expressed in EQUATION 2, for the cache page of FIG. 9, 42−6=36. It should be noted that an embodiment may define a hole or gap of missing data as one or more logically sequential tracks of missing data located between two tracks of data of the cache page or otherwise located at the very start of the cache page prior to a first track of cache data for the page. (e.g., such as illustrated by 652a as a track of missing data prior to tracks of data 656a for the cache page). In this manner, if there is a segment of one or more tracks of missing data at the very end (missing data hole or gap of one or more tracks ending with track 42) of a cache page, the segment of missing data tracks may not be counted as a hole or gap. Based on the foregoing that may be used in an embodiment to define a hole or gap, with reference to FIG. 9, 652a denoting track 1 of missing data may be considered a missing data hole or gap since it precedes an existing track of data in 656a included in the cache page. Similarly with reference to FIG. 8, tracks 1-5 (612a-e) may be included in a first missing data hole or gap that precedes the first track 6 of data 614 included in the cache for that page. However, with reference to FIG. 8, the last missing data track 42 612m may not be counted as a hole or gap since it occurs at the end of the cache page.

Generally, N, M and K may generally be characterized as weighting factors or coefficients for the above-mentioned three factors of EQUATION 1. An embodiment may select any suitable value for N, M and K to appropriately weight the different factors as desired in an embodiment. In at least one embodiment, page_WP_time may be in seconds, N may be selected as 1, M may be selected as 2, and K may be selected as 6. In an embodiment using a value of K, for example, between 6 and 8, values for N and M may be selected, for example, between 0.5 and 2.0. Generally, it should be noted that it may be relative weighting between N, M and K that may matter in an embodiment. It should be noted that the gap_sequential_factor may be more important in calculating the weight for each cache page using EQUATION 1 than the remaining factors of page_WP_time and number_of_missing_chunks_in_page/page_size and thus the value selected for K may be larger than values selected for N and M.

An embodiment may determine the above-mentioned weight W using EQUATION 1 for each cache page of the cache and accordingly select for destaging the cache page having the highest such weight W. Generally, the weights or W values may be determined periodically for all the cache pages and stored in a table or other structure in a sorted order. For example, W values may be sorted in decreasing order. The order in which cache pages are selected for destaging WP data at a point in time is based on this decreasing order of sorted W values for the cache pages. Destaging of WP data may be performed, in order, from cache pages starting with the highest W value and ending with the lowest W value.

Figure 10:
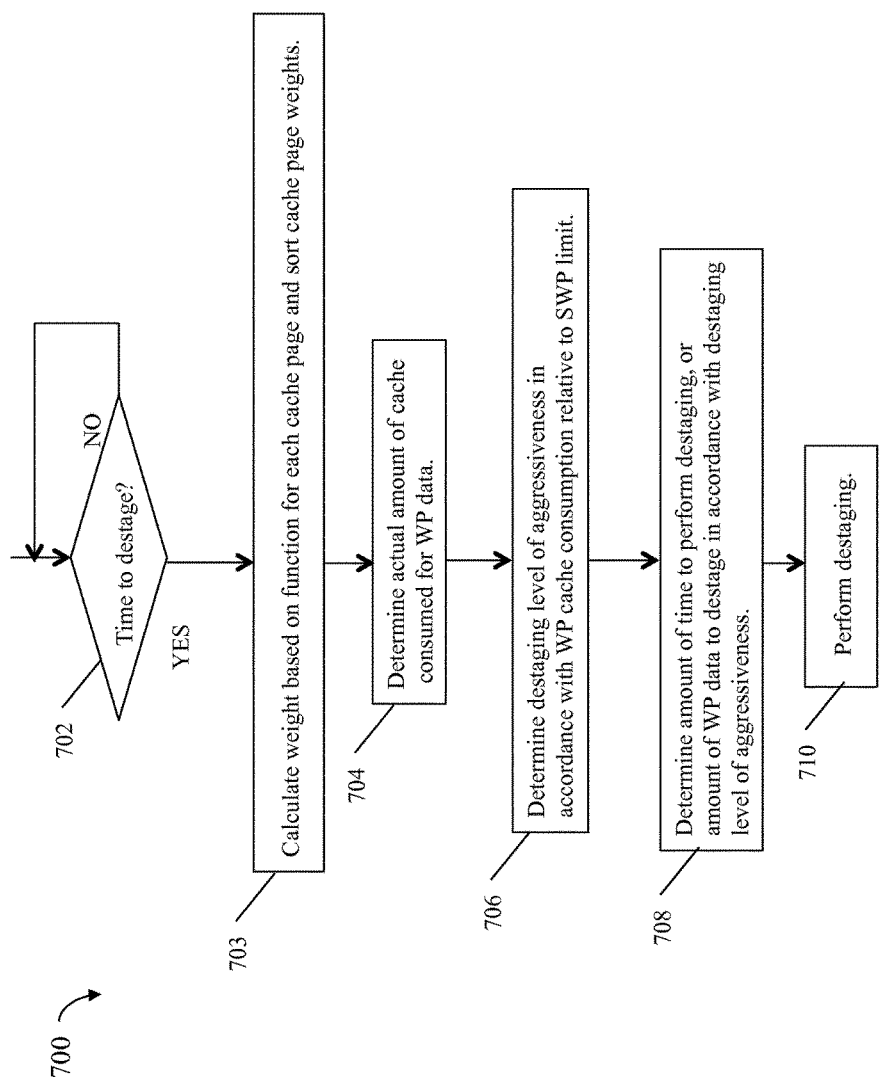
FIGS. 10, 11, 12 and 13 are flowcharts of processing steps that may be performed in an embodiment in accordance with techniques herein.

Referring to FIG. 10, shown is a flowchart of processing steps that may be performed by a process in an embodiment in accordance with techniques herein where the process performs destaging of selected cache pages using the weighting function described above, such as in EQUATION 1. The flowchart 700 outlines steps of a process that performs destaging of WP data having an ordering based on the W values determined using EQUATION 1. In this example, the destaging process may be scheduled to run at fixed time periods (e.g., at the occurrence of a defined time interval) where the amount of time that the process performs the destaging or the amount of data destaged each time the process runs varies with a desired level of aggressiveness. The level of aggressiveness may depend on how close the current level of consumed cache for WP data is with respect to the SWP limit or threshold. At step 702, a determination is made as to whether it is time to run the process for destaging. Control remains at step 702 until step 702 evaluates to yes and then proceeds to step 702. At step 703, the weight W based on EQUATION 1 may be calculated for each cache page and the weights, W values, for the cache pages may be accordingly sorted. At step 704, the actual amount of cache consumed for storing WP data is determined. At step 706, a destaging level of aggressiveness is determined in accordance with the current level of WP cache consumption (as determined in step 704) relative to the SWP limit. Generally, the closer the current level of WP cache consumption to the SWP limit, the larger the value for the level of aggressiveness. The larger the value the level of aggressiveness, the more aggressive the destaging. An embodiment may measure an amount of destaging performed in terms of processing time as well as amount of data destaged. Thus, in step 708, an embodiment may vary the processing time spent destaging or the amount of WP data destaged based on the level of aggressiveness determined in step 706. In step 708, the amount of time that destaging is performed may be determined based on the desired level of aggressiveness. In step 708, rather than determine or vary an amount of destaging in terms of time, the amount of WP data destaged may be measured and varied with the desired level of aggressiveness. At step 710, destaging of WP data from cache to physical storage is performed. The cache pages are selected in an order for destaging based on the weights or W values determined in step 703 with the cache pages having the highest W values being selected for destaging prior to any other cache page having a lower W value. The destaging process performing 700 processing may be scheduled for execution at a next time period (e.g., when the next fixed amount of time elapses).

Figure 11:
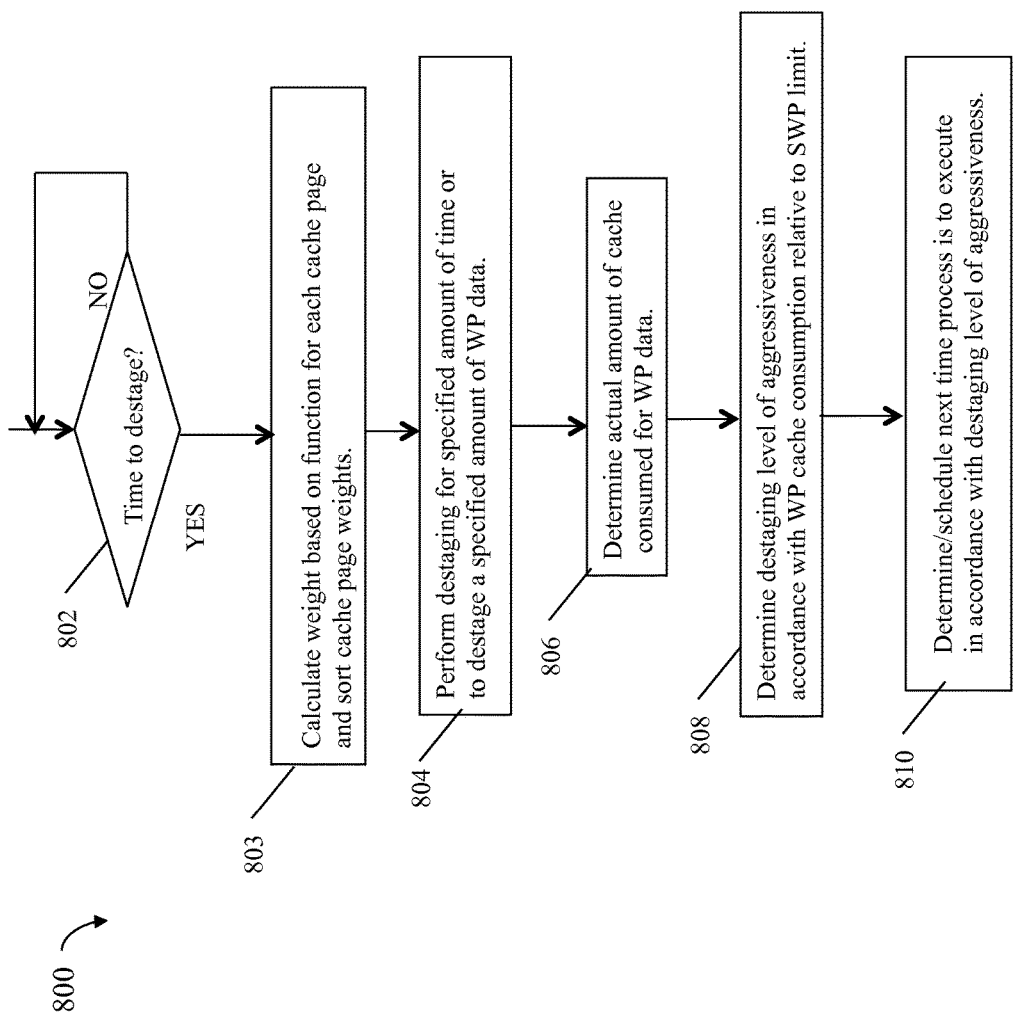

Referring to FIG. 11, shown is another flowchart of processing steps that may be performed by a process in an embodiment in accordance with techniques herein where the process performs destaging of selected cache pages using the weighting function described above, such as in EQUATION 1. The steps of flowchart 800 may be performed by the destaging process rather than the processing steps of the flowchart 700 of FIG. 10. The flowchart 800 outlines steps of a process that performs destaging of WP data having an ordering based on the W values determined using EQUATION 1. In this example, the destaging process may be scheduled to run at different points in time varying the time interval between executions based on the desired level of destaging aggressiveness. In other words, the frequency at which the destaging process is scheduled to run varies with the desired level of aggressiveness whereby the higher the level of destaging aggressiveness, the higher the frequency with which the process the level of aggressiveness depends on how close the current level of consumed cache for WP data is with respect to the SWP limit or threshold. The closer the current level to the SWP limit, the higher the level of aggressiveness and the greater the frequency of execution of the process (lesser time between scheduled executions). Steps 802 and 803 are respectively similar to steps 702 and 703 of FIG. 10. At step 804, destaging may be performed for a specified amount of time or to destage a specified amount of WP data each time the process executes. In other words, although the frequency with which the process executes may vary with level of aggressiveness, the amount of data or amount of time destaging is performed may be about the same each time the process runs (e.g., each time step 804 is executed). In this case, each time the process runs and executes step 804, a same or similar amount of data may be destaged or destaging may be performed for the same or approximately similar amount of time. Step 804 selects one or more cache pages including WP data for destaging in an order based on calculated weights or W values from step 803. As described elsewhere herein, a cache page having a first weight value is selected for destaging prior to any other cache page having a lower W value.

Steps 806 and 808 are respectively similar to steps 704 and 706 of FIG. 10. At step 810, the next scheduled execution time for the process performing step of 800 may be determined. The amount of time until the next scheduled execution may vary with the destaging level of aggressiveness. The higher the level of aggressiveness (and the more aggressive destaging desired), the sooner the next scheduled execution time for the process (e.g., the smaller the time interval until the next scheduled execution time).

Thus, FIGS. 10 and 11 illustrate different ways in which the amount of destaging processing performed, and therefore the amount of cached WP data destaged, varies with the desired level of aggressiveness whereby the level of aggressiveness may vary in accordance with how much cache is consumed for storing WP data (or more specifically, how close the amount of cache consumed for WP data is to the SWP limit).

It should be noted that FIGS. 10 and 11 include steps 703 and 803 for determining weights or W values of the cache pages as part of the processing performed each time the destaging process is scheduled to run. An embodiment may alternatively schedule another second process to run independent of the destaging process performing flowchart 700 or 800. The second process may calculate the W values or weights for the cache pages and the second process may execute at points in time independent of the destaging process performing flowchart 700 or 800 steps.

Additionally, in connection with FIGS. 10 and 11, it should be noted that the level of aggressiveness may determine that no destaging of WP data is needed, for example, if the total amount of WP cache consumption is below a specified threshold.

Figure 11A:
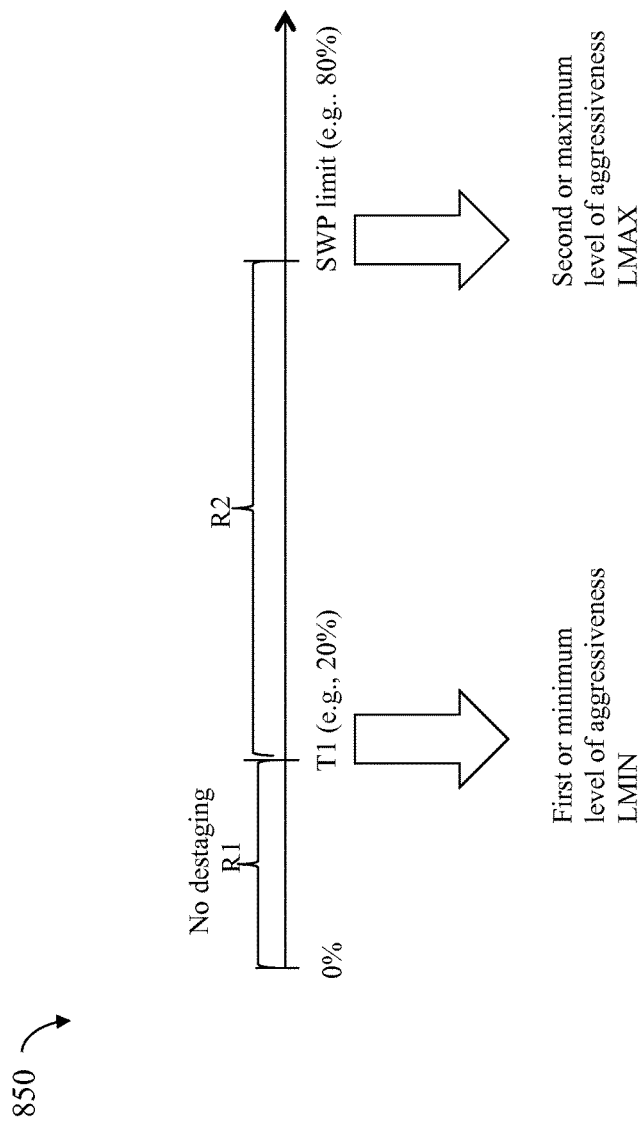
FIG. 11A is an example illustrating different limits and associated levels of destaging aggressiveness that may be used in an embodiment in accordance with techniques herein.

With reference to the example 850 of FIG. 11A, an embodiment may define a lower limit T1 (such as 20% of total data cache) in addition to the SWP limit. If the total amount of cache consumed for storing WP data is below or equal to T1 thereby in the range R1, no destaging of WP data may be performed. If the current amount of cache consumed for storing WP data is greater than T and in the range R2, a level of aggressiveness for destaging may be determined that varies with the current amount of cache consumed for storing WP data. In one embodiment, the level of aggressiveness and thus amount of destaging time or amount of data destaged may increase with the amount of cache consumed for storing WP data. For example, the level of aggressiveness may be increased from a first minimum level LMIN associated with T1 to a second maximum level LMAX associated with the SWP limit. The frequency with which the destaging process executes or the amount of time or data destaged may be scaled based on where the current amount of cache consumed for WP data falls in the range R2 between the first minimum level LMIN and the second maximum level LMAX. In one aspect, when the current amount of cache consumed for storing WP data is in the range R1, the level of aggressiveness may be zero so that no destaging is performed responsive to the current amount of cache consumed for storing WP data.

Based on the above, a trigger condition for destaging may be when the total amount of cache consumed for storing WP data for the system (e.g., all LUNs) exceeds some lower threshold and the aggressiveness at which WP data is destages varies with how close the current WP cache consumption is with respect to the SWP limit.

Figure 12:
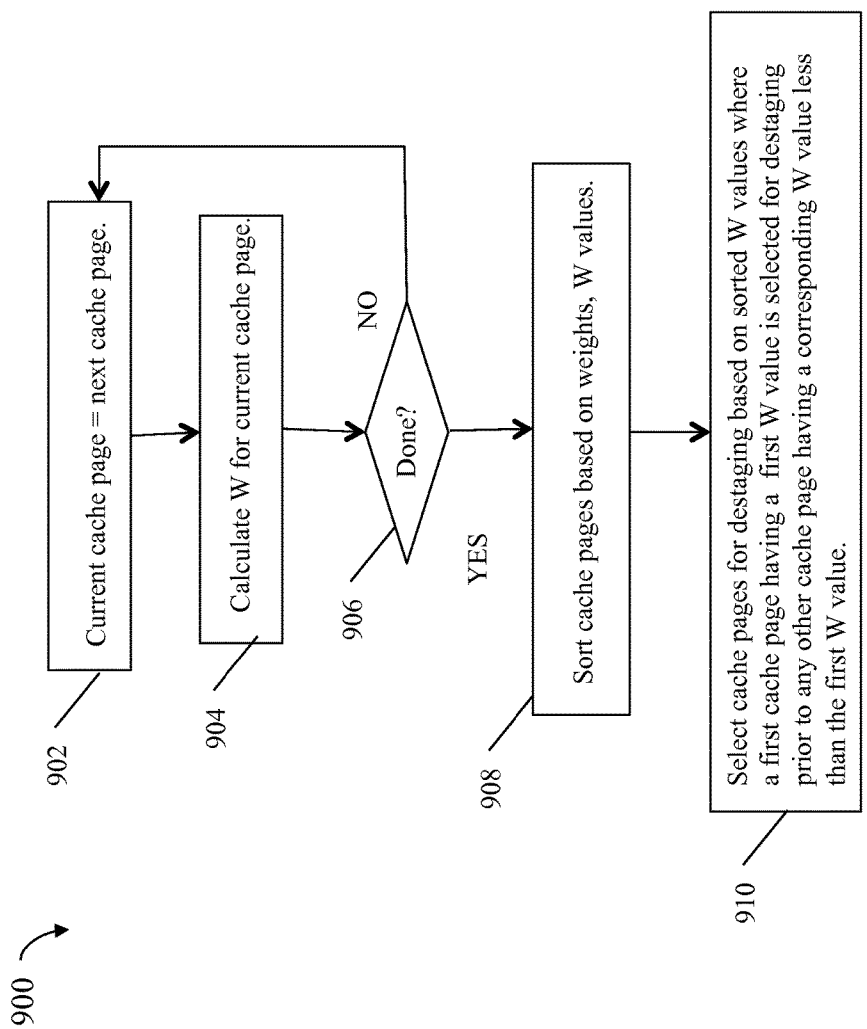

Referring to FIG. 12, shown is yet another flowchart 900 of processing steps that may be performed in an embodiment in accordance with techniques herein. The flowchart 900 includes steps as described above for generating and using a sorted list of calculated W values or weights, such as determined using EQUATION 1. The steps 902-908 described below may be performed, for example, by the second process mentioned above where the W values are then used in step 910 (as may be performed as part of the destaging processing in steps 710 and 804).

At step 902, the current cache page is assigned to be the next cache page in the data cache. At step 904, a W value or weight is calculated for the current cache page based on EQUATION 1 as described above. At step 906, a determination is made as to whether the W values have been calculated for all cache pages. If step 906 evaluates to no, control proceeds to step 902. If step 906 evaluates to yes, control proceeds to step 908 to sort the W values for the cache pages, such as based on decreasing order of W values. In step 910, cache pages are selected for destaging in an order based on sorted W values where a first cache page having a first W value is selected for destaging prior to any other cache page having a corresponding W value less than the first W value.

In order to prevent any one LUN for consuming too much cache for its WP data, an embodiment may also utilize a per LUN WP limit. For example, an embodiment may define the per LUN WP limit of 5% of the total amount of cache. An embodiment may thus define another trigger event for destaging as when an amount of cache consumed for WP data for a single LUN reaches, or comes within a defined threshold of, the per LUN WP limit. When such an event occurs, destaging of data from cache to physical storage may be triggered in connection with processing a subsequent write operation received for the LUN. Similar to that as described above, a level of aggressiveness may be determined with respect to how close the current amount of cache consumed for storing WP data for the LUN is to the per LUN WP limit. The number of "N" tracks destaged for that LUN when a next write operation is received for the LUN may vary with the level of aggressiveness.

In one embodiment, such destaging of data for the LUN may occur when there is a write to the LUN. Processing may be performed to destage the number of "N" tracks of WP data for the LUN to thereby reduce the amount of cache consumed for storing WP data for the LUN at or close to its per LUN WP limit. The N tracks of WP data selected may be the oldest N tracks of WP data for the LUN (e.g., the N tracks of WP data directed to the LUN that have been WP in the cache for the longest amount of time). Generally, N may be any integer value equal to or greater than 0.

Based on the foregoing per LUN WP limit, processing of FIG. 13 will now be described.

Figure 13:
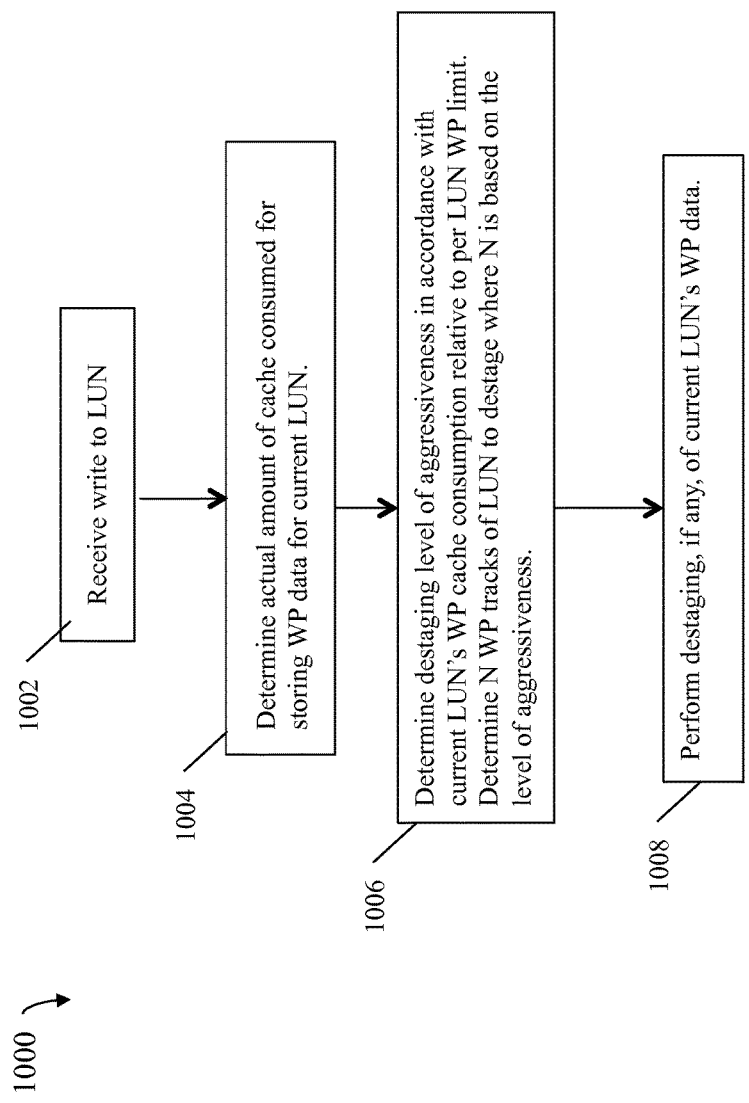

Referring to FIG. 13, shown is a flowchart of processing steps that may be performed by a process in an embodiment in accordance with techniques herein that selects WP cached data of particular LUNs for destaging. The processing of flowchart 1000 may be performed by an HA, for example, when a write is received for a LUN. At step 1002, a write operation is received for a LUN. At step 1004, the actual amount of cache consumed for storing WP data for the current LUN is determined. At step 1006, a destaging level of aggressiveness is determined in accordance with the current LUN"s WP cache consumption (as determined in step 1004) relative to the per LUN WP limit. Similar to that as described above with respect to the level of aggressiveness determined for the total WP cache consumption relative to the SWP limit, the closer the current WP cache consumption for the LUN to the per LUN WP limit, the higher the level of aggressiveness and the more aggressive the destaging of data for the current LUN. As part of step 1006, a number "N" of tracks to destage for the current LUN may be determined where N may vary with, and be determined in accordance with, the level of aggressiveness. N may be zero (0) or a positive integer value. At step 1008, destaging of N tracks of WP data for the current LUN may be performed. As described above, the N tracks selected and destaged in step 1008 for the current LUN may be based on age or the oldest "N" WP tracks of data currently in the cache for the current LUN. As described above, the amount of data destaged may be N tracks of the LUNs WP data where N may be determined as described elsewhere herein and vary with desired level of aggressiveness based on how close the amount of cache consumed for the LUN's WP data is to the per LUN WP limit. Thus, the level of aggressiveness and thus the value for N may be determined in a manner similar to that as described above such as with reference to FIG. 11A with the difference that the per LUN WP limit is used rather than the SWP limit and T1 is a lower threshold determined with respect to per LUN cache consumption for WP data.

In one embodiment, for a single LUN, N may be determined based on the ratio of a current amount of cache consumed for storing the LUN's WP data with respect to the per LUN WP limit. For example, when the ratio is 50% for a LUN denoting that the 50% of the per LUN WP limit is consumed for storing a LUN's WP data, N may be selected as 1 whereby WP data of a single track containing the oldest WP data for the LUN is destaged responsive to receiving a new write for the LUN. When the ratio is 100% for a LUN denoting that the 100% of the per LUN WP limit is consumed for storing a LUN's WP data, N may be selected as 32 whereby WP data of the 32 tracks containing the oldest WP for the LUN are destaged responsive to receiving a new write for the LUN. The foregoing values for N may be predefined and stored in a table in memory along with other values for N between 1 and 32 based on different ratio values. Different values for N may be determined based on interpolation or linear scaling. For example, when the ratio is 75% for a LUN denoting that the 75% of the per LUN WP limit is consumed for storing a LUN's WP data, N may be selected as 16 whereby WP data of the 16 tracks containing the oldest WP for the LUN are destaged responsive to receiving a new write for the LUN.

Based on the above, a trigger condition for destaging may be receiving a write operation for a LUN when the amount of cache consumed for storing WP data for the LUN exceeds some lower threshold. The level of aggressiveness at which WP data of the LUN is destaged varies with how close the LUN's current WP cache consumption is with respect to the per LUN WP limit.

It should be noted that an embodiment may perform processing of FIG. 10 or 11, which performs destaging based on a total amount of cache consumed for storing WP data with respect to all LUNs (e.g., for the entire data storage system) and also FIG. 13, which performs destaging based on an amount of cache consumed per LUN. In such an embodiment, when destaging is performed in any of steps 710 of FIG. 10 or 804 of FIG. 11, processing of FIG. 13 may be temporarily suspended. The foregoing suspension of FIG. 13 processing may be so that FIG. 13 destaging efforts do not compete with the other destaging efforts and techniques performed in connection with FIGS. 10 and 11 (e.g., FIGS. 10 and 11 select cached pages for destaging based on EQUATION 1 rather than selecting cache pages based on age of cached WP data for a particular LUN (e.g., criterion of FIG. 13 processing used to select WP tracks for destaging)).

Figure 14:
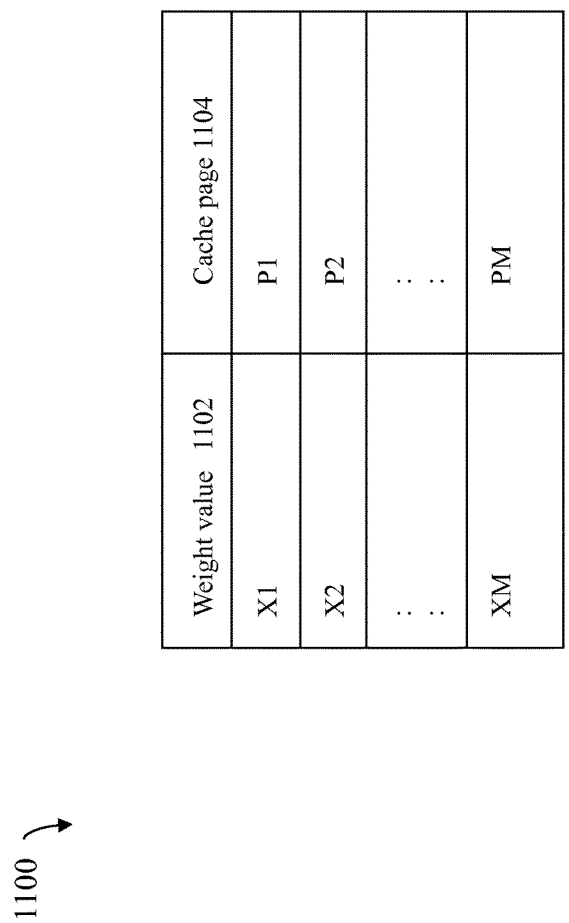
FIG. 14 is an example of a table including sorted weight values that may be used in an embodiment in accordance with techniques herein.

Referring to FIG. 14, shown is an example 1100 of a table of weight values (W values) and associated cache pages that may be used in an embodiment in accordance with techniques herein. As described herein, the weight function, as described above in connection with EQUATION 1, may be used to determine a weight value for each cache page. Periodically, weight values (W values) may be calculated using EQUATION 1 for the cache pages of the data cache. An embodiment may store the calculated weight values in decreasing sorted numerical order in a table such as illustrated in 1100. The table of 1100 includes a first column 1102 of the different weight values calculated for the cache pages and a second column 1104 identifying the cache pages associated with the different weight values in column 1102. The table 1100 includes rows each identifying a weight value in column 1102 and an associated cache page in column 1104 having the weight value of the same row. The rows of the table may be sorted or ordered such that X1 denotes the highest weight value and XM denotes the lowest weight value. The cache pages may be identified in 1104 via identifiers, pointers or links to cache pages or any other suitable means which associates each of the weight values in 1102 with a particular one of the cache pages in 1104 having the associated weight value.

The techniques herein may be performed by executing code which is stored on any one or more different forms of computer-readable media. Computer-readable media may include different forms of volatile (e.g., RAM) and non-volatile (e.g., ROM, flash memory, magnetic or optical disks, or tape) storage which may be removable or non-removable.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method of destaging data comprising:
receiving a plurality of I/O operations, said plurality of I/O operations including one or more write operations;
storing write data from the one or more write operations in one or more cache pages of a cache of a data storage system, wherein the cache is partitioned into a plurality of cache pages and the write data stored in the one or more cache pages is marked as write pending thereby denoting that the one or more cache pages include write data to be written out to physical storage;
determining a plurality of weight values for the plurality of cache pages, wherein each of the plurality of weight values is determined for a different one of the plurality of cache pages in accordance with a plurality of factors;
selecting for destaging a first cache page of the plurality of cache pages having a highest weight value of the plurality of weight values, wherein the first cache page includes at least some of the write data;
destaging the at least some of the write data of the first cache page to physical storage;
performing first processing to destage write pending data from the cache in accordance with a total amount of cache consumed in the data storage system for storing write pending data; and
performing second processing to destage write pending data from the cache in accordance with a first amount of cache currently consumed for storing write pending data for a single logical device, wherein the second processing is suspended when said first processing is performed.

2. The method of claim 1, wherein the plurality of factors includes a first factor identifying an amount of time since write pending data was last written to a cache page.

3. The method of claim 2, wherein each single one of the plurality of cache pages is partitioned into a plurality of portions and the plurality of factors includes a second factor identifying any of a first ratio of a number of missing data portions of a cache page with respect to the plurality of portions in a single cache page and a second ratio of a number of data portions present in a cache page with respect to the plurality of portions in a single cache page.

4. The method of claim 3, wherein the plurality of factors includes a third factor identifying a gap sequential factor denoting a number of missing data gaps in a cache page.

5. The method of claim 4, wherein said first factor is associated with a first weighting coefficient, said second factor is associated with a second weighting coefficient, and said third factor is associated with a third weighting coefficient.

6. The method of claim 5, wherein each of said first weighting coefficient, said second weighting coefficient, and said third weighting coefficient have a value denoting a relative level importance of each of said first weighting coefficient, said second weighting coefficient, and said third weighting coefficient.

7. The method of claim 5, wherein said third weighting coefficient is greater than said first weighting coefficient and said second weighting coefficient.

8. The method of claim 5, wherein if said second factor identifies the first ratio of a number of missing data portions of a cache page with respect to the plurality of portions in a single cache page, the second weighting coefficient is a negative value, and if the second factor identifies a second ratio of a number of data portions present in a cache page with respect to the plurality of portions in a single cache page, said second weighting coefficient is a positive value.

9. The method of claim 1, further comprising:
sorting the plurality of cache pages in accordance with the plurality of weight values.

10. The method of claim 9, wherein said sorting produces a ranked list of the plurality of cache pages whereby each of the plurality of cache pages at a position in the list having an associated one of the plurality of weight values is ranked higher than any other of the plurality of cache pages having another associated one of the weight values that is lower than said associated weight value.

11. The method of claim 1, wherein the plurality of factors assess characteristics of a cache page related to destaging performance.

12. The method of claim 1, wherein said first processing includes said selecting the first cache page and destaging at least some of the write data of the first cache page to physical storage and wherein said first processing includes destaging write pending data from the cache in accordance with a level of aggressiveness that varies and is selected based on where the total amount falls within a range from the first threshold to a second threshold.

13. The method of claim 12, wherein the level of aggressiveness affects an amount of write pending data destaged from the cache to physical storage.

14. The method of claim 1, further comprising:
receiving a write operation that writes first data to a first logical device;
determining a first amount of the cache currently consumed for storing write pending data directed to the first logical device;
determining, in accordance with the first amount relative to a threshold amount of cache per logical device, a level of aggressiveness related to destaging write pending data from the cache for the first logical device; and
destaging, in accordance with the level of aggressiveness, an amount of write pending data that is stored in the cache and directed the first logical device.

15. A system comprising:
a processor; and
a memory comprising code stored thereon that, when executed by the processor, performs a method that destages data comprising:
receiving a plurality of I/O operations, said plurality of I/O operations including one or more write operations;
storing write data from the one or more write operations in one or more cache pages of a cache, wherein the cache is partitioned into a plurality of cache pages and the write data stored in the one or more cache pages is marked as write pending thereby denoting that the one or more cache pages include write data to be written out to physical storage;
determining a plurality of weight values for the plurality of cache pages, wherein each of the plurality of weight values is determined for a different one of the plurality of cache pages in accordance with a plurality of factors;
selecting for destaging a first cache page of the plurality of cache pages having a highest weight value of the plurality of weight values, wherein the first cache page includes at least some of the write data;
destaging the at least some of the write data of the first cache page to physical storage;
performing first processing to destage write pending data from the cache in accordance with a total amount of cache consumed in the system for storing write pending data; and
performing second processing to destage write pending data from the cache in accordance with a first amount of cache currently consumed for storing write pending data for a single logical device, wherein the second processing is suspended when said first processing is performed.

16. The system of claim 15, wherein the plurality of factors assess characteristics of a cache page related to destaging performance and the first cache page with the highest weight value is assessed as having write pending data stored therein that, when destaged, achieves a best destaging performance relative to any other cache pages of the cache.

17. A non-transitory computer readable medium comprising code stored thereon that, when executed, performs a method that destages data, the method comprising:
receiving a plurality of I/O operations, said plurality of I/O operations including one or more write operations;
storing write data from the one or more write operations in one or more cache pages of a cache of a data storage system, wherein the cache is partitioned into a plurality of cache pages and the write data stored in the one or more cache pages is marked as write pending thereby denoting that the one or more cache pages include write data to be written out to physical storage;
determining a plurality of weight values for the plurality of cache pages, wherein each of the plurality of weight values is determined for a different one of the plurality of cache pages in accordance with a plurality of factors;
selecting for destaging a first cache page of the plurality of cache pages having a highest weight value of the plurality of weight values, wherein the first cache page includes at least some of the write data;
destaging the at least some of the write data of the first cache page to physical storage;
performing first processing to destage write pending data from the cache in accordance with a total amount of cache consumed in the data storage system for storing write pending data; and
performing second processing to destage write pending data from the cache in accordance with a first amount of cache currently consumed for storing write pending data for a single logical device, wherein the second processing is suspended when said first processing is performed.

18. The non-transitory computer readable medium of claim 17, wherein the plurality of factors assess characteristics of a cache page related to destaging performance.

19. The non-transitory computer readable medium of claim 17, wherein the plurality of factors includes a first factor identifying an amount of time since write pending data was last written to a cache page, a second factor related to a number of missing data portions of a cache page, and a third factor identifying a gap sequential factor denoting a number of missing data gaps in a cache page.

* * * * *